(12) United States Patent
Andersson et al.

(10) Patent No.: US 12,407,823 B2
(45) Date of Patent: Sep. 2, 2025

(54) ADAPTIVE LOOP FILTER (ALF) VIRTUAL BOUNDRY PROCESSING

(71) Applicant: Telefonaktiebolaget LM Ericsson (publ), Stockholm (SE)

(72) Inventors: Kenneth Andersson, Gävle (SE); Jacob Ström, Stockholm (SE); Zhi Zhang, Solna (SE); Jack Enhorn, Kista (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 188 days.

(21) Appl. No.: 17/915,579

(22) PCT Filed: Apr. 1, 2021

(86) PCT No.: PCT/EP2021/058686
§ 371 (c)(1),
(2) Date: Sep. 29, 2022

(87) PCT Pub. No.: WO2021/198456
PCT Pub. Date: Oct. 7, 2021

(65) Prior Publication Data
US 2023/0164312 A1 May 25, 2023

Related U.S. Application Data

(60) Provisional application No. 63/004,048, filed on Apr. 2, 2020.

(51) Int. Cl.
*H04N 19/117* (2014.01)
*H04N 19/132* (2014.01)
(Continued)

(52) U.S. Cl.
CPC ......... *H04N 19/117* (2014.11); *H04N 19/132* (2014.11); *H04N 19/176* (2014.11); *H04N 19/423* (2014.11)

(58) Field of Classification Search
None
See application file for complete search history.

(56) References Cited

U.S. PATENT DOCUMENTS

| | | | |
|---|---|---|---|
| 2021/0235078 A1* | 7/2021 | Hu | H04N 19/176 |
| 2021/0306672 A1* | 9/2021 | Bossen | H04N 19/117 |
| 2021/0306673 A1* | 9/2021 | Sarwer | H04N 19/182 |

OTHER PUBLICATIONS

International Search Report and Written Opinion issued in International Application No. PCT/EP2021/058686 dated Sep. 8, 2021 (14 pages).

(Continued)

*Primary Examiner* — Michael J Hess
(74) *Attorney, Agent, or Firm* — Rothwell, Figg, Ernst & Manbeck, P.C.

(57) ABSTRACT

A method (2400) for processing an image. The method includes obtaining (s2402) a set of sample values associated with the image, the set of sample values comprising a current sample value and sample values neighboring the current sample value, wherein the obtained set of sample values is included within a rectangular block of sample values, and the current sample value has a vertical position, y. The method also includes selecting (s2404) a filter strength value based on y, wherein selecting the filter strength value based on y comprises: selecting a first filter strength value if a condition is satisfied, otherwise if the condition is not satisfied selecting a second filter strength value, wherein the condition is satisfied only when y is equal to a predetermined value and the condition is not satisfied if y is not equal to the predetermined value. The method also includes filtering (s2406) the current sample based on the selected filter strength value.

8 Claims, 24 Drawing Sheets

(51) Int. Cl.
 *H04N 19/176* (2014.01)
 *H04N 19/423* (2014.01)

(56) References Cited

OTHER PUBLICATIONS

Andersson, K. et al., "Fix for ALF virtual boundary processing", Joint Video Experts Team (JVET) of ITU-T SG 16 WP 3 and ISO/IEC JTC 1/SC 29/WG 11, Document: JVET-Q0150, 17th Meeting: Brussels, BE, Jan. 7-17, 2020 (8 pages).

Bross, B. et al., "Versatile Video Coding (Draft 8)", Joint Video Experts Team (JVET) of ITU-T SG 16 WP 3 and ISO/IEC JTC 1/SC 29/WG 11, Document: JVET-Q2001-vE, 17th Meeting: Brussels, BE, Jan. 7-17, 2020 (513 pages).

* cited by examiner

ADAPTIVE LOOP FILTER (ALF) VIRTUAL BOUNDRY PROCESSING

CROSS REFERENCE TO RELATED APPLICATIONS

This application is a 35 U.S.C. § 371 National Stage of International Patent Application No. PCT/EP2021/058686, filed 2021 Apr. 1, which claims priority to U.S. provisional patent application No. 63/004,048, filed on 2020 Apr. 2. The above identified applications are incorporated by this reference.

TECHNICAL FIELD

This disclosure relates to video processing.

BACKGROUND

A video sequence consists of several images (also referred to herein as "pictures"). When viewed on a screen, the image consists of pixels, each pixel having a red, green and blue value (RGB). However, when encoding and decoding a video sequence, the image is often not represented using RGB but typically using another color space, including but not limited to YCbCr, ICTCP, non-constant-luminance YCbCr, and constant luminance YCbCr. If one takes the example of non-constant luminance YCbCr, which is currently the most used representation, it is made up of three components, Y, Cb and Cr. It is often the case that Y, which is called luma and which roughly represents luminance, is of full resolution, whereas the two other components, Cb and Cr, called chroma, are of a smaller resolution. A typical example is a high definition (HD) video sequence containing 1920×1080 RGB pixels, which is often represented by a 1920×1080-resolution Y component, a 960×540 Cb component and a 960×540 Cr component. The elements in the components are called samples. In the example given above, there are therefore 1920×1080 samples in the Y component, and hence a direct relationship between samples and pixels. Therefore, in this document, the term pixels and samples can be used interchangeably. For the Cb and Cr components, there is no direct relationship between samples and pixels; a single Cb sample typically influences several pixels.

In the draft for the Versatile Video Coding standard (VVC) that is developed by the Joint Video Experts Team (JVET) (see reference [1]) (also referred to herein as the "VVC Draft Specification"), the decoding of an image is carried out in two stages; prediction coding and loop filtering. In the prediction decoding stage, the samples of the components (Y, Cb and Cr) are partitioned into rectangular blocks. As an example, one block may be of size 4×8 samples, whereas another block may be of size 64×64 samples. The decoder obtains instructions for how to obtain a prediction for each block, for instance to copy samples from a previously decoded image (an example of temporal prediction) or copy samples from already decoded parts of the current image (an example of intra prediction), or a combination thereof. To improve this prediction, the decoder may obtain a residual, often encoded using transform coding such as discrete sine or cosine transform DST or DCT. This residual is added to the prediction, and the decoder can proceed to decode the next block.

The output from the prediction decoding stage is the three components Y, Cb and Cr. However, it is possible to further improve the fidelity of these components, and this is done in the loop filtering stage. The loop filtering stage in VVC consists of three sub-stages; a deblocking filter stage, a sample adaptive offset filter (SAO) sub-stage, and an adaptive loop filter (ALF) sub-stage. In the deblocking filter sub-stage, the decoder changes Y, Cb and Cr by smoothing edges near block boundaries when certain conditions are met. This increases perceptual quality (subjective quality) since the human visual system is very good at detecting regular edges such as block artifacts along block boundaries. In the SAO sub-stage, the decoder adds or subtracts a signaled value to samples that meet certain conditions, such as being in a certain value range (band offset SAO) or having a specific neighborhood (edge offset SAO). This can reduce ringing noise since such noise often aggregate in a certain value range or in specific neighborhoods (e.g., in local maxima). The reconstructed image component that are the result of this stage are denoted YSAO, CbSAO, CrSAO.

This disclosure relates to the third sub-stage called "adaptive loop filtering" or ALF. The basic idea behind adaptive loop filtering is that the fidelity of the image components YSAO CbSAO and CrSAO can often be improved by filtering the image using a linear filter that is signaled from the encoder to the decoder. As an example, by solving a least-squares problem, the encoder can determine what coefficients a linear filter should have in order to most efficiently lower the error between the reconstructed image components so far, YSAO, CbSAO, CrSAO, and the original image components Yorg, Cborg and Crorg. These coefficients can then be signaled from the encoder to the decoder. The decoder reconstructs the image as described above to get YSAO, CbSAO, and CrSAO, obtains the filter coefficients from the bit stream and then applies the filter to get the final output, which is denoted YALF, CbALF, CrALF.

In VVC, the ALF luma filter is more advanced than this. To start with, it is observed that it is often advantageous to filter some samples with one set of coefficients, but avoid filtering other samples, or perhaps filter those other samples with another set of coefficients. To that end, VVC classifies every Y sample (i.e., every luma sample) into one of 25 classes. Which class a sample belongs to is decided for each 4×4 block based on the local neighborhood of that sample (8×8 neighborhood), specifically on the gradients of surrounding samples and the activity of surrounding samples. As can be seen from the VVC Draft Specification four variables are computed to determine the characteristics of the local neighborhood of the current sample where filtH measures gradient horizontally, filtV measures gradients vertically, filtD0 measure gradients diagonally top left to bottom right and filtD1 measures gradients diagonally top right to bottom left:

$$\text{filtH}[i][j] = \text{Abs}(\,(\text{recPicture}[h_{x4+i}][v_{y4+j}] << 1) - \text{recPicture}[h_{x4+i-1}][v_{y4+j}] - \text{recPicture}[h_{x4+i+1}][v_{y4+j}]\,) \quad (1471)$$

$$\text{filtV}[i][j] = \text{Abs}(\,(\text{recPicture}[h_{x4+i}][v_{y4+j}] << 1) - \text{recPicture}[h_{x4+i}][v_{y4+j-1}] - \text{recPicture}[h_{x4+i}][v_{y4+j+1}]\,) \quad (1472)$$

$$\text{filtD0}[i][j] = \text{Abs}(\,(\text{recPicture}[h_{x4+i}][v_{y4+j}] << 1) - \text{recPicture}[h_{x4+i-1}][v_{y4+j-1}] - \text{recPicture}[h_{x4+i+1}][v_{y4+j+1}]\,) \quad (1473)$$

$$\text{filtD1}[i][j] = \text{Abs}(\,(\text{recPicture}[h_{x4+i}][v_{y4+j}] << 1) - \text{recPicture}[h_{x4+i+1}][v_{y4+j-1}] - \text{recPicture}[h_{x4+i-1}][v_{y4+j+1}]\,) \quad (1474)$$

Then these variables are summed up in a local neighborhood around the current sample to get a more reliable estimate of the directionality of the neighborhood as follows where sumH indicates the sum of filtH, sumV the sum of filtV, sumD0 the sum of filtD0, sumD1 the sum of filtD1 and sumOfHV the sum of sumV and sumV from VVC Draft Specification below:

The variables sumH[x][y], sumV[x][y], sumD0[x][y], sumD1[x][y] and sumOfHV[x][y] are derived as follows:

sumH[ x ][ y ] = $\Sigma_i \Sigma_j$ filtH[ i ][ j ], with i = −2..5, j = minY . . . maxY (1475)

sumV[ x ][ y ] = $\Sigma_i \Sigma_j$ filtV[ i ][ j ], with i = −2..5, j = minY . . . maxY (1476)

sumD0[ x ][ y ] = $\Sigma_i \Sigma_j$ filtD0[ i ][ j ], with i = −2..5, j = minY . . . maxY (1477)

sumD1[ x ][ y ] = $\Sigma_i \Sigma_j$ filtD1[ i ][ j ], with i = −2..5, j = minY . . . maxY (1478)

sumOfHV[ x ][ y ] = sumH[ x ][ y ] + sumV[ x ][ y ] (1479)

To avoid using samples below a virtual boundary when determining these metrics for a subblock above the virtual boundary and to avoid using samples above the virtual boundary when determining these metrics for a subblock below the virtual boundary following restrictions of min Y and max Y are made and also adjustments of a metric scaling factor ac:

- The variables x4 and y4 are set as ( x << 2 ) and ( y << 2 ), respectively.
- The variables minY, maxY, and ac[ x ][ y ] are derived as follows:
  - If y4 is equal to ( CtbSizeY − 8 ) and one of the following condition is true, minY is set equal to −2, maxY is set equal to 3, and ac[ x ][ y ] is set equal to 3.
    - The bottom boundary of the current coding tree block is the bottom boundary of the picture and pic_height_in_luma_samples − yCtb > CtbSizeY − 4.
    - The bottom boundary of the current coding tree block is not the bottom boudary of the picture.
  - Otherwise, if y4 is equal to ( CtbSizeY − 4 ) and one of the following condition is true, minY is set equal to 0, maxY is set equal to 5, and ac[ x ][ y ] is set equal to 3.
    - The bottom boundary of the current coding tree block is the bottom boundary of the picture and pic_height_in_luma_samples − yCtb > CtbSizeY − 4.
    - The bottom boundary of the current coding tree block is not the bottom boudary of the picture
  - Otherwise, minY is set equal to −2 and maxY is set equal to 5, and ac[ x ][ y ] is set equal to 2.

To avoid using samples above the virtual boundary for metric calculations of the row just below the virtual boundary and avoid using samples below the virtual boundary for metric calculations of the row just above the virtual boundary clipping parameters are determined in the boundary position derivation process in WC draft:

---

8.8.5.5 ALF boundary position derivation process

Inputs of this process are:
- a luma location ( xCtb, yCtb ) specifying the top-left sample of the current luma coding tree block relative to the top left sample of the current picture,
- a luma location ( x, y ) specifying the current sample relative to the top-left sample of the current luma coding tree block.
Output of this process are:
- the left vertical boundary position clipLeftPos,
- the right vertical boundary position clipRightPos,
- the above horizontal boundary position clipTopPos,
- the below horizontal boundary position clipBottomPos,
- the top left boundary flag clipTopLeftFlag,
- the bottom right boundary flag clipBotRightFlag.
The variables clipLeftPos, clipRightPos, clipTopPos and clipBottomPos are
set equal to −128.
The variables clipTopLeftFlag and clipBotRightFlag are both set equal to 0.
The variable clipTopPos is modified as follows:
- If y − ( CtbSizeY − 4 ) is greater than or equal to 0, the variable clipTopPos is set equal to yCtb + CtbSizeY − 4.
- Otherwise, if VirtualBoundariesPresentFlag is equal to 1, and

---

-continued 8.8.5.5 ALF boundary position derivation process yCtb + y − VirtualBoundariesPosY[ n ] is greater than or equal to 0 and less than 3 for any n = 0..NumHorVirtualBoundaries − 1, the following applies:
  clipTopPos =
  VirtualBoundariesPosY[ n ]  (1510)
- Otherwise, if y is less than 3 and one or more of the following conditions are true, the variable clipTopPos is set equal to yCtb:
  - The top boundary of the current coding tree block is the top boundary of the tile, and loop_filter_across_tiles_enabled_flag is equal to 0.
  - The top boundary of the current coding tree block is the top boundary of the slice, and loop_filter_across_slices_enabled_flag is equal to 0.
  - The top boundary of the current coding tree block is the top boundary of the subpicture, and
    loop_filter_across_subpic_enabled_flag[ CurrSubpicIdx ] is equal to 0.
The variable clipBottomPos is modified as follows:
- IfVirtualBoundariesPresentFlag is equal to 1, VirtualBoundariesPosY[ n ] is not equal to pic_height_in_luma_samples − 1 or 0, and

---

-continued 8.8.5.5 ALF boundary position derivation process

VirtualBoundariesPosY[ n ] − yCtb − y is greater than 0 and less than 5 for any n = 0..NumHorVirtualBoundaries − 1, the following applies:
  clipBottomPos =
  VirtualBoundariesPosY[ n ]  (1511)
- Otherwise, if CtbSizeY − 4 − y is greater than 0 and is less than 5, the variable clipBottomPos is set equal to yCtb + CtbSizeY − 4.
- Otherwise, if CtbSizeY − y is less than 5, and one or more of the following conditions are true, the variable clipBottomPos is set equal to yCtb + CtbSizeY:
  - The bottom boundary of the current coding tree block is the bottom boundary of the tile, and loop_filter_across_tiles_enabled_flag is equal to 0.
  - The bottom boundary of the current coding tree block is the bottom boundary of the slice, and loop_filter_across_slices_enabled_flag is equal to 0.
  - The bottom boundary of the current coding tree block is the bottom boundary of the subpicture, and
    loop_filter_across_subpic_enabled_flag[ CurrSubpicIdx ] is equal to 0.
The variable clipLeftPos is modified as follows:
- If VirtualBoundariesPresentFlag is equal to 1, and
  xCtb + x − VirtualBoundariesPosX[ n ] is greater than or equal to 0 and less than 3 for any n = 0..NumVerVirtualBoundaries − 1, the following applies:
  clipLeftPos =
  VirtualBoundariesPosX[ n ]  (1512)
- Otherwise, if x is less than 3, and one or more of the following conditions are true, the variable clipLeftPos is set equal to xCtb:
  - The left boundary of the current coding tree block is the left boundary

| 8.8.5.5 ALF boundary position derivation process |
|---|
| of the tile, and loop_filter_across_tiles_enabled_flag is equal to 0.
- The left boundary of the current coding tree block is the left boundary of the slice, and loop_filter_across_slices_enabled_flag is equal to 0.
- The left boundary of the current coding tree block is the left boundary of the subpicture, and loop_filter_across_subpic_enabled_flag[ CurrSubpicIdx ] is equal to 0.
The variable clipRightPos is modified as follows:
- If VirtualBoundariesPresentFlag is equal to 1, and VirtualBoundariesPosX[ n ] − xCtb − x is greater than 0 and less than 5 for any n = 0..NumVerVirtualBoundaries − 1, the following applies:
    clipRightPos = VirtualBoundariesPosX[ n ]   (1513)
- Otherwise, if CtbSizeY − x is less than 5, and one or more of the following conditions are true, the variable clipRightPos is set equal to xCtb + CtbSizeY:
- The right boundary of the current coding tree block is the right boundary of the tile, and loop_filter_across_tiless_enabled_flag is equal to 0.
- The right boundary of the current coding tree block is the right boundary of the slice, and loop_filter_across_slices_enabled_flag is equal to 0.
- The right boundary of the current coding tree block is the right boundary of the subpicture, and loop_filter_across_subpic_enabled_flag[ CurrSubpicIdx ] is equal to 0.
The variable clipTopLeftFlag and clipBotRightFlag are modified as following:
- If the coding tree block covering the luma position (xCtb, yCtb) and the coding tree block covering the luma position ( xCtb − CtbSizeY, yCtb − CtbSizeY) belong to different slices, and loop_filter_across_slices_enabled_flag is equal to 0, clipTopLeftFlag is set equal to 1.
- If the coding tree block covering the luma position (xCtb, yCtb) and the coding tree block covering the luma position (xCtb + CtbSizeY, yCtb + CtbSizeY) belong to different slices, and loop_filter_across_slices_enabled_flag is equal to 0, clipBotRightFlag is set equal to 1. |

The clipping parameters are then used in a padding process to pad necessary samples in VVC draft:

| 8.8.5.6 ALF sample padding process |
|---|
| Inputs of this process are:
- a luma location ( xCtb, yCtb ) specifying the top-left sample of the current luma coding tree block relative to the top left sample of the current picture,
- a luma location ( x, y ) specifying the neighbouring sample relative to the top-left sample of the current picture,
- a flag isChroma specifiying whether the colour componenet is chroma component or not,
- the left vertical boundary position clipLeftPos,
- the right vertical boundary position clipRightPos,
- the above horizontal boundary position clipTopPos,
- the below horizontal boundary position clipBottomPos,
- the top left boundary flag clipTopLeftFlag,
- the bottom right boundary flag clipBotRightFlag.
Outputs of this process are:
- modified luma location ( x, y ) specifying the neighbouring sample relative to the top-left sample of the current picture,
The variables picWidth, picHeight, xCtbCur, yCtbCur, CtbSizeHor, CtbSizeVer, topBry, botBry, leftBry and rightBry are derived as follows:
    picWidth = isChroma ? pic_width_in_luma_samples / SubWidthC : pic_width_in_luma_samples (1514)
    picHeight = isChroma ? pic_height_in_luma_samples / SubHeightC : pic_height_in_luma_samples (1515)
    xCtbCur = isChroma ? xCtb / SubWidthC : xCtb (1516)
    yCtbCur = isChroma ? yCtb / SubHeightC : yCtb (1517)
ctbSizeHor = isChroma ? CtbSizeY / SubWidthC : CtbSizeY (1518)
ctbSizeVer = isChroma ? CtbSizeY / SubHeightC : CtbSizeY (1519)
topBryPos = isChroma ? clipTopPos / SubHeightC : clipTopPos (1520)
    botBryPos = isChroma ? clipBottomPos / SubHeightC : clipBottomPos (1521) |

| 8.8.5.6 ALF sample padding process |
|---|
| leftBryPos = isChroma ? clipLeftPos / SubWidthC : clipLeftPos (1522)
    rightBryPos = isChroma ? clipRightPos / SubWidthC : clipRightPos (1523)
The variables (x , y ) is modified as follows:
- When topBryPos is not less than 0, the following applies:
  y = Clip3( topBryPos, picHeight − 1, y ) (1524)
- When botBryPos is not less than 0, the following applies:
  y = Clip3( 0, botBryPos − 1, y ) (1525)
- When leftBryPos is not less than 0, the following applies:
  x = Clip3( leftBryPos, picWidth − 1, x ) (1526)
- When rightBryPos is not less than 0, the following applies:
  x = Clip3( 0, rightBryPos − 1, x ) (1527)
- (x, y ) is set equal to ( xCtbCur, y ) if all of the followig conditions are true:
  - clipTopLeftFlag is equal to true
  - topBryPos is less than 0 and leftBryPos is less than 0
  - x is less than xCtbCur and y is less than yCtbCur
- (x, y ) is set equal to ( xCtbCur + CtbSizeHor − 1, y ) if all of the followig conditions are true:
  - clipBotRightFlag is equal to true
  - botBryPos is less than 0 and rightBryPos is less than 0
  - x is greater than xCtbCur + CtbSizeHor − 1 and y is greater than yCtbCur + CtbSizeVer − 1 |

Finally, based on these metrics, a classification is made to determine which set of filters filtIdx to use for the current sample and also a transposeIdx such that several directionalities can share the same filter coefficients, from VVC Draft Specification below:

The classification filter index array filtIdx and transpose index array transposeIdx are derived by the following steps:
The classification filter index array filtIdx and transpose index array transposeIdx are derived by the following steps:
1. The variables dir1[x][y ], dir2[ x ][ y ] and dirS[ x ][ y ] with x, y = 0..CtbSizeY − 1 are derived as follows:
  - The variables hv1, hv0 and dirHV are derived as follows:
    - If sumV[ x >> 2 ][ y >> 2 ] is greater than sumH[ x >> 2 ][ y >> 2 ], the following applies:
      hv1 = sumV[ x >> 2 ][ y >> 2 ]   (1480)
      hv0 = sumH[x >> 2 ][ y >> 2]   (1481)
      dirHV = 1   (1482)
    - Otherwise, the following applies:
      hv1 = sumH[x >> 2 ][ y >> 2 ]   (1483)
      hv0 = sumV[ x >> 2 ][ y >> 2 ]   (1484)
      dirHV = 3   (1485)
  - The variables d1, d0 and dirD are derived as follows:
    - IfsumD0[x >> 2 ][ y >> 2 ]isgreaterthan sumD1[x >> 2][y >> 2 ], the following applies:
      d1 = sumD0[x >> 2 ][ y >> 2 ]   (1486)
      d0 = sumD1[x >> 2 ][ y >> 2]   (1487)
      dirD = 0   (1488)
    - Otherwise, the following applies:
      d1 = sumD1[x >> 2 ][ y >> 2 ]   (1489)
      d0 = sumD0[x >> 2 ][ y >> 2]   (1490)
      dirD = 2   (1491)
  - The variables hvd1, hvd0, are derived as follows:
    hvd1 = ( d1 * hv0 > hv1 * d0 ) ? d1 : hv1   (1492)
    hvd0 = ( d1 * hv0 > hv1 * d0 ) ? d0 : hv0   (1493)
  - The variables dirS[ x ][ y ], did [ x ][ y ] and dir2 x ][ y ] derived as follows:
    dir1[ x ][ y ] = ( d1 * hv0 > hv1 * d0 ) ? dirD : dirHV   (1494)
    dir2[ x ][ y ] = ( d1 * hv0 > hv1 * d0 ) ? dirHV : dirD   (1495)
    dirS[ x ][ y ] = ( hvd1 *2 > 9 * hvd0 ) ? 2 : (( hvd1 > 2 * hvd0 ) ? 1 : 0)   (1496)
2. The variable avgVar[ x ][ y ] with x, y = 0..CtbSizeY − 1 is derived as follows:
varTab[ ] = { 0, 1,2, 2, 2, 2, 3, 3, 3, 3, 3, 3, 3, 3, 3, 4 }   (1497)
avgVar[ x ][ y ] = varTab[ Clip3( 0, 15, ( sumOfHV[ x >> 2 ] [ y >> 2 ] * (1498)
    ac[ x >> 2 ][ y >> 2 ] ) >> ( BitDepth − 1 ) ) ]

-continued

3. The classification filter index array filtIdx[ x ][ y ] and the transpose index array
    transposeIdx[ x ][ y ] with x = y = 0..CtbSizeY − 1 are derived as follows:
    transposeTable[ ] = { 0, 1, 0, 2, 2, 3, 1,3 }
    transposeIdx[ x ][ y ] = transposeTable[ dir1[ x ][ y ] * 2 + ( dir2[ x ] [ y ] >> 1 )]
    filtIdx[ x ][ y ] = avgVar[ x ][ y ]
    - When dirS[ x ][ y ] is not equal 0, filtIdx[ x ][ y ] is modified as follows:
    filtIdx[ x ][ y ] += ( ( ( dir1[ x ][ y ] & 0x1 ) << 1 ) + dirS[ x ][ y ] ) * 5 (1499)

From above it can be seen that filtIdx equal to 0 to 4 do not have any specific directional characteristics. A value of filterIdx greater than 4 corresponds to directionality of the samples, since this means that dirS is greater than 0. Studying the addition to filtIdx, $$\text{filtIdx}[x][y] += (((\text{dir1}[x][y] \& 0x1) << 1) + \text{dirS}[x][y]) * 5,$$

if there is a diagonal directionality, i.e., if dir1 is either 0 or 2, the first term will be zero and one can add either 1*5 (if dirS=1) or 2*5 (if dirS=2). (If dirS=0 the addition will not be performed). Hence all values of filterIdx from 5 to 14 correspond to a diagonal directionality of the samples. Likewise, if there is a horizontal or vertical directionality, i.e., if dir1 is either 1 or 3, then the first term (dir1 & 1))<<1 will become 2. Therefore, in this case, either add (2+1)*5 (if dirS=1) or add (2+2)*5 (if dirS=2) resulting in values between 15 and 24. Hence, filtIdx indicates the directionality of the surrounding samples in the following way as described in the below table:

| filtIdx range | Directionality |
| --- | --- |
| 0 . . . 4 | No directionality |
| 5 . . . 14 | Diagnoal directionality (dir1 = 0 or 2) |
| 15 . . . 24 | Horizontal or vertical directionality (dir1 = 1 or 3) |

Where transposeIdx equal to 0 corresponds to no transpose of the filter coefficients, transposeIdx equal to 1 corresponds to mirror the filter coefficients along the diagonal from top right to bottom left, transposeIdx equal to 2 corresponds to mirror the filter coefficients along the vertical axis and transposeIdx equal to 3 corresponds to rotating the filter coefficients 90 degrees.

This means that when the filterIdx is between 15 and 24 and transposeIdx is equal to 3 the local structure around the current sample has a vertical directionality and when transposeIdx is equal to 0 the local structure around the current sample has a horizontal directionality.

It is possible for the encoder to signal one set of coefficients for each of the 25 classes. In VVC the ALF coefficients are signaled in the adaptive parameter sets (APS) that then can be referred by an aps index that determines which of the defined sets to use to when decoding pictures. The decoder will then first decide which class a sample belongs to, and then select the appropriate set of coefficients to filter the sample. However, signaling 25 sets of coefficients can be costly. Hence the VVC standard also allows that only a few of the 25 classes are filtered using unique sets of coefficients. The remaining classes may reuse a set of coefficients used in another class, or it may be determined that it should not be filtered at all. For samples belonging to Cb or Cr, i.e., for chroma samples, no classification is used and the same set of coefficients is used for all samples.

Transmitting the filter coefficients is costly, and therefore the same coefficient value is used for two filter positions. For luma (samples in the Y-component), the coefficients are re-used in the way shown in FIG. 1.

As shown in FIG. 1, each coefficient is used twice in the filter, and FIG. 1 shows the spatial neighborhood that the luma filter covers (i.e., FIG. 1 shows the other sample values that are used to filter the value of the current sample (i.e., the sample value in the center of neighborhood) and its configuration with regards to filter coefficients for luma. It can be seen that the filter coverage is symmetric and covers up to 3 samples away from the center both horizontally and vertically.

Assume R(x,y) is the sample to be filtered, situated in the middle of the FIG. 1. Then samples R(x,y−1) (the sample exactly above) and the sample R(x,y+1) (the sample exactly below) will be treated with the same coefficient ZC6.

The filtered version of the reconstructed sample in position (x,y), which is denoted $R_F(x,y)$, is calculated in the following way from WC Draft Specification equation 1411 to 1426 and Table 43, where $(x,y)=(h_x,v_y)$ and C0=f[idx[0]], C1=f[idx[1]], C2=f[idx[2]], C3=f[idx[3]], C4=f[idx[4]], C5=f[idx[5]], C6=f[idx[6]], C7=f[idx[7]], C8=f[idx[8]], C9=f[idx[9]], C10=f[idx[10]] and C11=f[idx[11]]:

---

8.8.5.2 Coding tree block filtering process for luma samples

Inputs of this process are:
- a reconstructed luma picture sample array recPicture prior to the adaptive loop filtering process,
- a filtered reconstructed luma picture sample array alfPictureL,
- a luma location (xCtb, yCtb ) specifying the top-left sample of the current luma coding tree block relative to the top left sample of the current picture.

Output of this process is the modified filtered reconstructed luma picture sample array alfPictureL.

The derivation process for filter index clause 8.8.5.3 is invoked with the location (xCtb, yCtb ) and the reconstructed luma picture sample array recPicture as inputs, and filtIdx[ x ][ y ] and transposeIdx[ x ][ y ] with x, y = 0..CtbSizeY − 1 as outputs.

For the derivation of the filtered reconstructed luma samples alfPicture[ x ][ y ], each reconstructed luma sample inside the current luma coding tree block recPicture[ x ][ y ] is filtered as follows with x, y = 0..CtbSizeY − 1:
- The array of luma filter coefficients f[ j ] and the array of luma clipping values c[ j ] corresponding to the filter specified by filtIdx[ x ][ y ] is derived as follows with j = 0..11:
    - If AlfCtbFiltSetIdxY[ xCtb >> CtbLog2SizeY ][ yCtb >> CtbLog2SizeY ] is less than 16, the following applies:
        i = AlfCtbFiltSetIdxY[ xCtb >> CtbLog2SizeY ][ yCtb >> CtbLog2SizeY ]
        (1453)

-continued

8.8.5.2 Coding tree block filtering process for luma samples

- $f[\,j\,]$ = AlfFixFiltCoeff AlfClassToFiltMap[ i ][ filtIdx[ x ][ y ] ][ j ]  (1454)
- $c[\,j\,]$ = $2^{BiDepth}$  (1455)
- Otherwise (AlfCtbFiltSetIdxY[ xCtb >> CtbLog2SizeY ][ yCtb >> CtbLog2SizeY ] is greater than or equal to 16, the following applies:
  i = slice_alf_aps_id_luma[ AlfCtbFiltSetIdxY[ xCtb >> CtbLog2SizeY ][ yCtb >> CtbLog2SizeY ] − 16]  (1456)
  $f[\,j\,]$ = AlfCoeff$_L$[ i ][ filtIdx[ x ][ y ] ][ j ]   (1457)
  $c[\,j\,]$ = AlfC lipL i ][ filtIdx[ x ][ y ] ][ j ]   (1458)
- The luma filter coefficients and clipping values index idx are derived depending on transposeIdx[ x ][ y ] as follows:
  - If transposeIndex[ x ][ y ] is equal to 1, the following applies:
    idx[ ] = { 9, 4, 10, 8, 1,5, 11, 7, 3, 0, 2, 6 }  (1459)
  - Otherwise, if transposeIndex[ x ][ y ] is equal to 2, the following applies:
    idx[ ] = { 0, 3, 2, 1, 8, 7, 6, 5, 4, 9, 10, 11 }  (1460)
  - Otherwise, if transposeIndex[ x ][ y ] is equal to 3, the following applies:
    idx[ ] = { 9, 8, 10, 4, 3, 7, 11, 5, 1, 0, 2, 6}  (1461)
  - Otherwise, the following applies:
    idx[ ] = { 0, 1,2, 3, 4, 5, 6, 7, 8, 9, 10, 11 }  (1462)
- The locations ( $h_{x+i}$, $v_{y+j}$ ) for each of the corresponding luma samples ( x, y ) inside the given array recPicture of luma samples with i, j = −3..3 are derived as follows:
  $h_{x+i}$ = Clip3( 0, pic_width_in_luma_samples − 1, xCtb + x + i)  (1463)
  $v_{y+j}$ = Clip3( 0, pic_height_in_luma_samples − 1, yCtb + y + j)  (1464)
- The variables clipLeftPos, clipRightPos, clipTopPos, clipBottomPos, clipTopLeftFlag and clipBotRightFlag are derived by invoking the ALF boundary position derivation process as specified in clause 8.8.5.5 with ( xCtb, yCtb ) and ( x, y ) as inputs.
- The variables $h_{x+i}$ and $v_{y+j}$ are modified by invoking the ALF sample padding process as specified in clause 8.8.5.6 with (xCtb, yCtb ), ($h_{x+i}$, $V_{y+j}$ ), 0, clipLeftPos, clipRightPos, clipTopPos, clipBottomPos, clipTopLeftFlag and clipBotRightFlag as input.
- The variable applyAlfLineBufBoundaryis derived as follows:
  - If the bottom boundary of the current coding tree block is the bottom boundary of current picture and pic_height_in_luma_samples − yCtb <= CtbSizeY − 4, applyAlfLineBufBoundary is set equal to 0:
  - Otherwise, applyAlfLineBufBoundary is set equal to 1.
- The vertical sample position offsets y1, y2, y3 and the variable alfShiftY are specified in Table 45 according to the vertical luma sample position y and applyAlfLineBufBoundary.
- The variable curr is derived as follows:
  curr = recPicture[ $h_x$ ][ $v_y$ ]   (1465)
- The variable sum is derived as follows:
  sum = f[ idx[ 0 ] ] * ( Clip3( −c[ idx[ 0 ] ], c[ idx[ 0 ] ], recPicture[ $h_x$ ][ $v_{y+y3}$ ] − curr) +
      Clip3( −c[ idx[ 0 ] ], c[ idx[ 0 ] ], recPicture[ $h_x$ ][ $v_{y-y3}$ ] − curr ) )
  +
  f[ idx[ 1 ] ] * ( Clip3( −c[ idx[ 1 ] ], c[ idx[ 1 ] ], recPicture[ $h_{x+1}$ ][ $v_{y+y2}$ ] − curr) +
      Clip3( −c[ idx[ 1 ] ], c[ idx[ 1 ] ], recPicture[ $h_{x-1}$ ][ $v_{y-y2}$ ] − curr ) ) +
  f[ idx[ 2 ] ] * ( Clip3( −c[ idx[ 2 ] ], c[ idx[ 2 ] ], recPicture[ $h_x$ ][ $v_{y+y2}$ ] − curr) +
      Clip3( −c[ idx[ 2 ] ], c[ idx[ 2 ] ], recPicture[ $h_x$ ][ $v_{y-y2}$ ] − curr ) )
  +
  f[ idx[ 3 ] ] *( Clip3( −c[ idx[ 3 ] ], c[ idx[ 3 ] ], recPicture[ $h_{x-1}$ ][ $v_{y+y2}$ ] − curr) +
      Clip3( −c[ idx[ 3 ] ], c[ idx[ 3 ] ], recPicture[ $h_{x+1}$ ][ $v_{y-y2}$ ] − curr ) ) +
  f[ idx[ 4 ] ] * ( Clip3( −c[ idx[ 4 ] ], c[ idx[ 4 ] ], recPicture[ $h_{x+2}$ ][ $v_{y+y1}$ ] − curr) +
      Clip3( −c[ idx[ 4 ] ], c[ idx[ 4 ] ], recPicture[ $h_{x-2}$ ][ $v_{y-y1}$ ] − curr ) ) +
  f[ idx[ 5 ] ] *( Clip3( −c[ idx[ 5 ] ], c[ idx[ 5 ] ], recPicture[ $h_{x+1}$ ][ $v_{y+y1}$ ] − curr) +
      Clip3( −c[ idx[ 5 ] ], c[ idx[ 5 ] ], recPicture[ $h_{x-1}$ ][ $v_{y-y1}$ ] − curr ) ) +
  f[ idx[ 6 ] ] * ( Clip3( −c[ idx[ 6 ] ], c[ idx[ 6 ] ], recPicture[ $h_x$ ][ $v_{y+y1}$ ] − curr) +
      Clip3( −c[ idx[ 6 ] ], c[ idx[ 6 ] ], recPicture[ $h_x$ ][ $v_{y-y1}$ ] − curr ) )
  + (1466)
  f[ idx[ 7 ] ] * ( Clip3( −c[ idx[ 7 ] ], c[ idx[ 7 ] ], recPicture[ $h_{x-1}$ ][ $v_{y+y1}$ ] − curr) +
      Clip3( −c[ idx[ 7 ] ], c[ idx[ 7 ] ], recPicture[ $h_{x+1}$ ][ $v_{y-y1}$ ] − curr ) ) +
  f[ idx[ 8 ] ] * ( Clip3( −c[ idx[ 8 ] ], c[ idx[ 8 ] ], recPicture[ $h_{x-2}$ ][ $v_{y+y1}$ ] − curr) +
      Clip3( −c[ idx[ 8 ] ], c[ idx[ 8 ] ], recPicture[ $h_{x+2}$ ][ $v_{y-y1}$ ] − curr ) ) +
  f[ idx[ 9 ] ] * ( Clip3( −c[ idx[ 9 ] ], c[ idx[ 9 ] ], recPicture[ $h_{x+3}$ ][ $v_y$ ] − curr ) +
      Clip3( −c[ idx[ 9 ] ], c[ idx[ 9 ] ], recPicture[ $h_{x-3}$ ][ $v_y$ ] − curr ) )
  +

8.8.5.2 Coding tree block filtering process for luma samples f[ idx[ 10 ] ] * ( Clip3( −c[ idx[ 10 ] ], c[ idx[ 10 ] ], recPicture[ $h_{x+2}$ ][ $v_y$ ] − curr ) +
    Clip3( −c[ idx[ 10 ] ], c[ idx[ 10 ] ], recPicture[ $h_{x-2}$ ][ $v_y$ ] − curr)) +
f[ idx[ 11 ] ] * ( Clip3( −c[ idx[ 11 ] ], c[ idx[ 11 ] ], recPicture[ $h_{x+1}$ ][ $v_y$ ] − curr) +
    Clip3( −c[ idx 11 ] ], c[ idx[ 11 ] ], recPicture[ $h_{x-1}$ ][ $v_y$ ] − curr ) )
sum = curr + (( sum + 64 ) >> alfShiftY )    (1467)

- The modified filtered reconstructed luma picture sample
alfPicture$_L$[ xCtb + x ][ yCtb + y ] is derived as follows:
    alfPicture$_L$[ xCtb + x ][ yCtb + y ] = Clip3( 0, (1 << BitDepth ) − 1, sum )    (1468)

Table 45 from the VVC Draft Specification is shown below:

TABLE 45

Specification of y1, y2, y3 and alfShiftY according to the vertical luma sample position y and applyAlfLineBufBoundary

| Condition | alfShiftY | y1 | y2 | y3 |
|---|---|---|---|---|
| (y = = CtbSizeY − 5 \|\| y = = CtbSizeY − 4) && (applyAlfLineBufBoundary = = 1) | 10 | 0 | 0 | 0 |
| (y = = CtbSizeY − 6 \|\| y = = CtbSizeY − 3) && (applyAlfLineBufBoundary = = 1) | 7 | 1 | 1 | 1 |
| (y = = CtbSizeY − 7 \|\| y = = CtbSizeY − 2) && (applyAlfLineBufBoundary = = 1) | 7 | 1 | 2 | 2 |
| otherwise | 7 | 1 | 2 | 3 |

CtbSizeY is the vertical size of the coding tree unit (CTU) (i.e., a unit comprising at least a block of luma samples and a block of chroma samples). A CTU in VVC typically comprises square block of luma samples (a.k.a., a luma coding tree block (CTB)) of size 128×128. Here the Clip3 (x,y,z) operation simply makes sure that the magnitude of the value z never exceeds y or goes below x:

$$\text{Clip3}(x, y, z) = \begin{cases} x & ; \quad z < x \\ y & ; \quad z > y \\ z & ; \quad \text{otherwise} \end{cases}$$

The clipping parameters "c[x]" are also to be signaled from the encoder to the decoder.

Decoding an image is done in sequential CTU order. As an example, if the video frame has 512×256 samples, it can consist of two rows of 128×128 CTUs where each row will have four CTUs. A naïve decoder could perform the prediction decoding stage on all CTUs followed by performing the loop filtering stage on all CTUs. However, this would be inefficient, at least for a hardware decoder, since the decoder would then need to hold all the CTUs in memory at the same time. Ideally, a hardware decoder would instead like to decode the image CTU by CTU, holding only the equivalent of one CTUs worth of frame buffer in memory at every instance. However, this is not possible, since the loop filters such as deblocking and SAO filter across CTU boundaries. Especially, the final values of the last few lines in the upper row of CTUs depend on the values of the top few lines of the CTUs in the lower row. Therefore, when decoding two rows of CTUs, an efficient decoder would divide the decoding process into an upper and lower stage:

In the upper stage, all processing that can be done while only having read the information from the upper CTU is performed. In the lower stage, the processing that needs information also from the lower CTU is carried out. Currently in VVC, this can be done as follows:

Upper Stage:
1. Decoding of upper CTU;
2. SAO of upper CTU, except the last few lines;
3. ALF of upper CTU, except the last few lines (not necessarily the same lines as in 2).

Lower Stage
4. Decoding of lower CTU, at least the top part necessary for deblocking;
5. Deblocking of the upper CTU;
6. SAO of the last few lines of the upper CTU that were skipped in 2;
7. ALF of the last few lines of the upper CTU that were skipped in 3.

Since the lower stage needs some information from the upper CTU, this information is typically stored in what is referred to as line buffers. In detail, a typical hardware decoder, would save the bottom-most lines of samples of the upper CTU in line buffers, from where it can be accessed easily. An individual line buffer stretches the entire width of the screen but is only one sample tall. As an example, if five line buffers are needed to store vital information in our example, the decoder only needs to store 5×512=25600 samples. This is a lot, but considerably less than the 512× 256=131072 samples that would be needed if the decoder would need to store the entire framebuffer before loop filtering started. However, even if 25600 samples is considerably less, it is still expensive in terms of silicon surface area. Therefore, in many parts of the VVC standard, reading outside the CTU is prohibited or restricted, so that there is less of a need for expensive line buffers.

Before the concept of "virtual horizontal CTU boundary" was introduced, the line buffer requirement was 11 line buffers, of which ALF required 6 lines (rows). For reference, this solution is termed the "No Virtual Boundary Solution."

The "No Virtual Boundary Solution" includes the following steps:

Step 1 (upper stage) would first be decoding the upper CTU. FIG. 2 shows how a 4×4 block 2102 is decoded after previous blocks 2101 have been decoded. This step proceeds until all blocks of the CTU have been decoded.

Step 2 (upper stage) will now perform SAO processing of all lines of the upper CTU except for lines M, N O and P. This is because, as shown in 3, while filtering a sample 3101 on line L only requires samples that will not be affected by deblocking, a sample 3102 on line M cannot be processed by SAO since deblocked samples from line N are not available.

Step 3 (upper stage) will now perform ALF filtering on all the lines it can. This means that it will ALF filter all lines in the upper CTU except for J, K, L, M, N, O and P. This is because, as shown in FIG. 4, while filtering a sample 4101 on line I only requires samples for which SAO samples are already available from step 2, a sample 4102 on the next line M cannot be processed by ALF since SAO-processed samples (post-SAO samples) from line M through P are not available.

Step 4 (lower stage) will now do decoding of the lower CTU.

Step 5 (lower stage) will do deblocking of lines N-P in the upper CTU as well as lines Q and forward in the lower CTU. To do that it will need to access lines M, N, O and P of pre-SAO data. This data must have been previously stored in step 1 above as a line buffer. In total this is four line buffers.

Step 6 (lower stage) will do SAO of the missing lines from step two, i.e., lines M, N, O and P. To do that it needs to read line L, M, N, O, P and Q of pre-SAO data. All these lines are available from step 5 except for line L, which must have been previously stored as a line buffer in step 1. That is one extra line buffer.

Step 7 (lower stage) will perform ALF filtering on the missing lines from step 3, i.e., lines J through P. To do so it needs post-SAO data of lines G, H, I, J, K and L. That is an additional six line buffers. Step 7 also needs post-SAO data from lines M through P but that is available locally from step 6.

In total such a solution would thus need 6 lines (G H I J K L) of post-SAO data and 5 lines (L M N O P) of pre-SAO data, i.e., 11 line buffers. That is a lot of data, and therefore the concept of ALF virtual boundaries was adopted into VVC. This is referred to as the "Current VVC Solution".

The "Current VVC Solution" includes the following steps:

Steps 1 and 2 (upper stage) are carried out the same way as for the "No Virtual Boundary Solution".

To be able to ALF-filter more of the lines in FIG. 4, the shape of the ALF filter is changed when close to a virtual boundary 5101, which is placed between line L and line M (see FIG. 5). That is, virtual boundary 5101 is placed four samples above the border between the lower CTU and upper CTU.

Step 3 (upper stage) thus avoids accessing samples below the virtual boundary 5101 by making the filter smaller. This means that all lines up to and including line L can be filtered using ALF in the upper stage. All the post-SAO samples needed to ALF-filter lines A-L are available since they have been provided in step 2 (see FIG. 3).

Step 4 (lower stage, same as before) will now do decoding of the lower CTU.

Step 5 (lower stage, same as before) will do deblocking of lines N-P in the upper CTU, as well as lines in the lower CTU. To do that it will need to access lines M, N, O and P of pre-SAO data. That is four line buffers.

Step 6 (lower stage, same as before) will do SAO of the missing lines from step two, i.e., lines M, N, O and P. To do that it needs to read line L of pre-SAO data. That is one extra line buffer.

Step 7 (lower stage) will again change the filter size when carrying out ALF near the virtual boundary, as is seen in FIG. 6. Since it does not read any data above the virtual boundary, and since all its input data is available from step 6 (post-SAO of M, N, O P etc) no extra line buffers are needed in this step.

As one can see, the "Current VVC Solution" now only needs five line buffers: four lines of pre-SAO samples (M, N O P) to do deblocking of lines N O and P, as well as one line of pre-SAO samples (line L) to be able to do SAO of line M. In total, only five line buffers are needed, a reduction of more than half.

However, one drawback with the solution is that no ALF filtering across the virtual boundary is performed. If the filter coefficients C9, C10, and C11 from FIG. 1 are very large, this means that sample 6102 in FIG. 6 will be filtered very strongly in the x-direction but not at all in the y-direction. This will cause blurring along diagonal lines, which will be visible in the image. For that reason, alternative 2 in the JVET contribution JVET-Q0150 [2] introduced attenuated filtering for the case when the filter is situated directly above or directly below the virtual boundary 5101. This version of the filter was adopted and incorporated in draft 8 of the VVC standard. This is reflected in Table 45:

TABLE 45

Specification of y1, y2, y3 and alfShiftY according to the vertical luma sample position y and applyAlfLineBufBoundary

| Condition | alfShiftY | y1 | y2 | y3 |
|---|---|---|---|---|
| (y == CtbSizeY − 5 \|\| y == CtbSizeY − 4) && (applyAlfLineBufBoundary == 1) | 10 | 0 | 0 | 0 |
| (y == CtbSizeY − 6 \|\| y == CtbSizeY − 3) && (applyAlfLineBufBoundary == 1) | 7 | 1 | 1 | 1 |
| (y == CtbSizeY − 7 \|\| y == CtbSizeY − 2) && (applyAlfLineBufBoundary == 1) | 7 | 1 | 2 | 2 |
| otherwise | 7 | 1 | 2 | 3 |

Here the value alfShiftY is 10 if adjacent the virtual boundary. This effectively means that the filtering strength is 16 times smaller compared to if filtering one or more steps away from the virtual boundary, where alfShiftY is equal to 7.

Changing the ALF coefficients do not influence which samples are used, and therefore this solution, which was included into the latest draft of the VVC standard, is fully described by the "Current WC Solution" mentioned above.

Another approach, which was presented in JVET-Q0150 as alternative 1, was not adopted. In this alternative, the virtual boundary was moved one row upwards to the position between rows K and L, as can be seen in FIG. 7. This solution is termed the "Alternative-1 Solution."

The "Alternative-1 Solution" includes the following steps:

Steps 1 and 2 (upper stage) are carried out the same way as for the "No Virtual Boundary Solution", which is also the same as for the "Current VVC Solution".

Step 3 (upper stage) is different from previous solutions. The virtual boundary (7101 in FIG. 7) has been moved one line upwards. It has also been changed compared to the "Current WC Solution" in that ALF is allowed to access one row below the virtual boundary. In FIG. 7 it can be seen how samples 7102, 7103 and 7104 are ALF-filtered in step 3. The sample 7105 however cannot be filtered, since it relies on post-SAO samples on line M, which are unavailable in the upper stage since they rely on samples on line N which can be altered by deblocking.

Step 4 (lower stage, same as before) will now do decoding of the lower CTU.

Step 5 (lower stage, same as before) will do deblocking of lines N-P in the upper CTU.

To do that it will need to access lines M, N, O and P of pre-SAO data. That is four line buffers.

Step 6 (lower stage, same as before) will do SAO of the missing lines from step two, i.e., lines M, N, O and P. To do that it needs to read line L of pre-SAO data. That is one extra line buffer.

Step 7 (lower stage) will differ from previous solutions. When filtering 7105, it will need post-SAO data from line K, L and M. Only line M will be available in the lower stage (it is calculated in step 6), the other two will need to be stored as line buffers. That is two extra line buffers.

In short, the "Alternative-1 Solution" needs seven line buffers (4 due to deblocking, one due to SAO and 2 due to ALF).

SUMMARY

A problem with the existing solutions is that none of them is without drawbacks. For example, the "No Virtual Boundary Solution" gives no visual artifacts at all, but costs a full eleven line buffers; the "Current VVC Solution" gives blurring artifacts close to the virtual boundary. On the other hand it is cheap, requiring only five line buffers; and the "Alternative-1 Solution" gives less artifacts but it is costly, needing seven line buffers.

Line buffers are costly; if 8K resolution of 7680×4320 samples is used, then 7680 samples of 10 bits each are needed per line buffer. That equals 7680*10/8=9600 bytes for every line buffer. The "Alternative-1 Solution" is therefore 2*9600=19200 bytes or 18.75 kBytes more expensive than the "Current VVC Solution". That may not sound much, but this memory is likely going to be needed to stay on-chip, which means that it will consume a considerable part of the chip's surface area.

At the same time, the "Current VVC Solution" is also unsatisfactory, since it still generates visible artifacts. The fact that these artifacts, if they appear, appear at the same place in the image at all times means that they are relatively easy to spot, making the situation worse.

Aspects of this disclosure describes solutions to the above noted problems that both give a better visual quality than the "Current VVC Solution" and at the same time is a lot cheaper to implement than the "Alternative-1 Solution" in that it requires fewer line buffers.

In one embodiment the "Current VVC Solution" and the "Alternative-1 Solution" are combined so that the "Current VVC Solution" is used for samples above the virtual boundary, while a solution similar to the "Alternative-1 Solution" is used for samples below the virtual boundary in that it reads samples above the virtual boundary when filtering below it. In this embodiment, the virtual boundary is not moved compared to the "Current VVC Solution." Its placement is therefore different to the "Alternative-1 Solution".

In this embodiment, only one extra line buffer is needed. Also, this disclosure describes a way of storing that extra line buffer so that it requires only 6 bits per sample instead of the typical 10 bits per sample that would otherwise be needed. Thus, the extra cost can be seen as equivalent to 0.6 extra line buffers, or 5.6 line buffers in total. This is much less expensive than the 7 line buffers needed to implement the "Alternative-1 Solution," and almost as cheap as the 5 line buffers needed by the "Current VVC Solution."

Accordingly, in one aspect there is provided a method for processing (e.g., encoding or decoding) an image. In one embodiments, the method includes obtaining a set of sample values associated with the image, the set of sample values comprising a current sample value and sample values neighboring the current sample value, wherein the obtained set of sample values is included within a rectangular block of sample values, and the current sample value has a vertical position, y. The method also includes selecting a filter strength value based on y, wherein selecting the filter strength value based on y comprises: selecting a first filter strength value if a condition is satisfied, otherwise if the condition is not satisfied selecting a second filter strength value, wherein the condition is satisfied only when y is equal to a predetermined value and the condition is not satisfied if y is not equal to the predetermined value. The method also includes filtering the current sample based on the selected filter strength value.

In another embodiment the method includes obtaining a first set of sample values associated with the image, the first set of sample values comprising a first sample value and a second sample value, wherein the first sample value has a vertical position, y1, wherein y1 is directly above a virtual boundary, and the second sample value has a vertical position, y2, wherein y2 is below the virtual boundary. The method also includes filtering the first sample value using only sample values from the set of sample values that have a vertical position of y1. The method also includes filtering the second sample value using at least i) sample values from the set of sample values that have a vertical position of y1 and ii) sample values from the set of sample values that have a vertical position of y2.

In another embodiment the method includes obtaining a set of sample values associated with the image, the set of sample values comprising a current sample value and sample values neighboring the current sample value, wherein the obtained set of sample values is included within a rectangular block of sample values. The method also includes storing in a buffer a Sample Adaptive Offset, SAO, offset value, SAOoffset[x]. The method also includes determining a post SAO sample value, postSAOsample[x]. The method also includes filtering the current sample using postSAOsample[x]. The determining postSAOsample[x] comprises: retrieving SAOoffset[x] from the buffer; and i) setting postSAOsample[x] equal to (SAOoffset[x]+preSAOsample[x]) if (SAOoffset[x]+preSAOsample[x]) is not less than A and not greater than B, wherein A and B are predetermined values, ii) setting postSAOsample[x] equal to A if (SAOoffset[x]+preSAOsample[x]) is less than A, or iii) setting postSAOsample[x] equal to B if (SAOoffset[x]+preSAOsample[x]) is greater than B.

In another aspect there is provided a computer program comprising instructions which when executed by processing circuitry of an apparatus causes the apparatus to perform the methods disclosed herein. In another aspect there is provided a carrier containing the computer program, wherein the carrier is one of an electronic signal, an optical signal, a radio signal, and a computer readable storage medium.

In another aspect there is provided an apparatus, where the apparatus is configured to perform the methods disclosed herein. In some embodiments, the apparatus includes processing circuitry and a memory containing instructions executable by the processing circuitry, whereby the apparatus is configured to perform the methods disclosed herein.

The embodiments are advantageous in that they improve considerably the visual quality compared to the Current VVC Solution. This means that the blurring artifacts associated with the Current VVC Solution are removed or greatly reduced.

DETAILED DESCRIPTION

Figure 12:
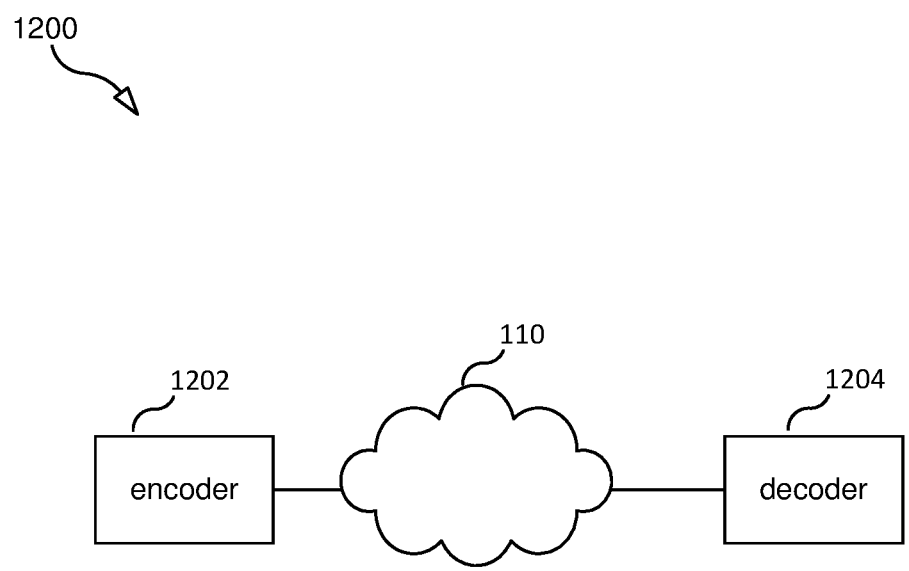
FIG. 12 illustrates a system according to an embodiment.

FIG. 12 illustrates a system 1200 according to an example embodiment. System 1200 includes an encoder 1202 and a decoder 1204. In the example shown, decoder 1204 can receive via a network 110 (e.g., the Internet or other network) encoded images produced by encoder 1202.

Figure 13:
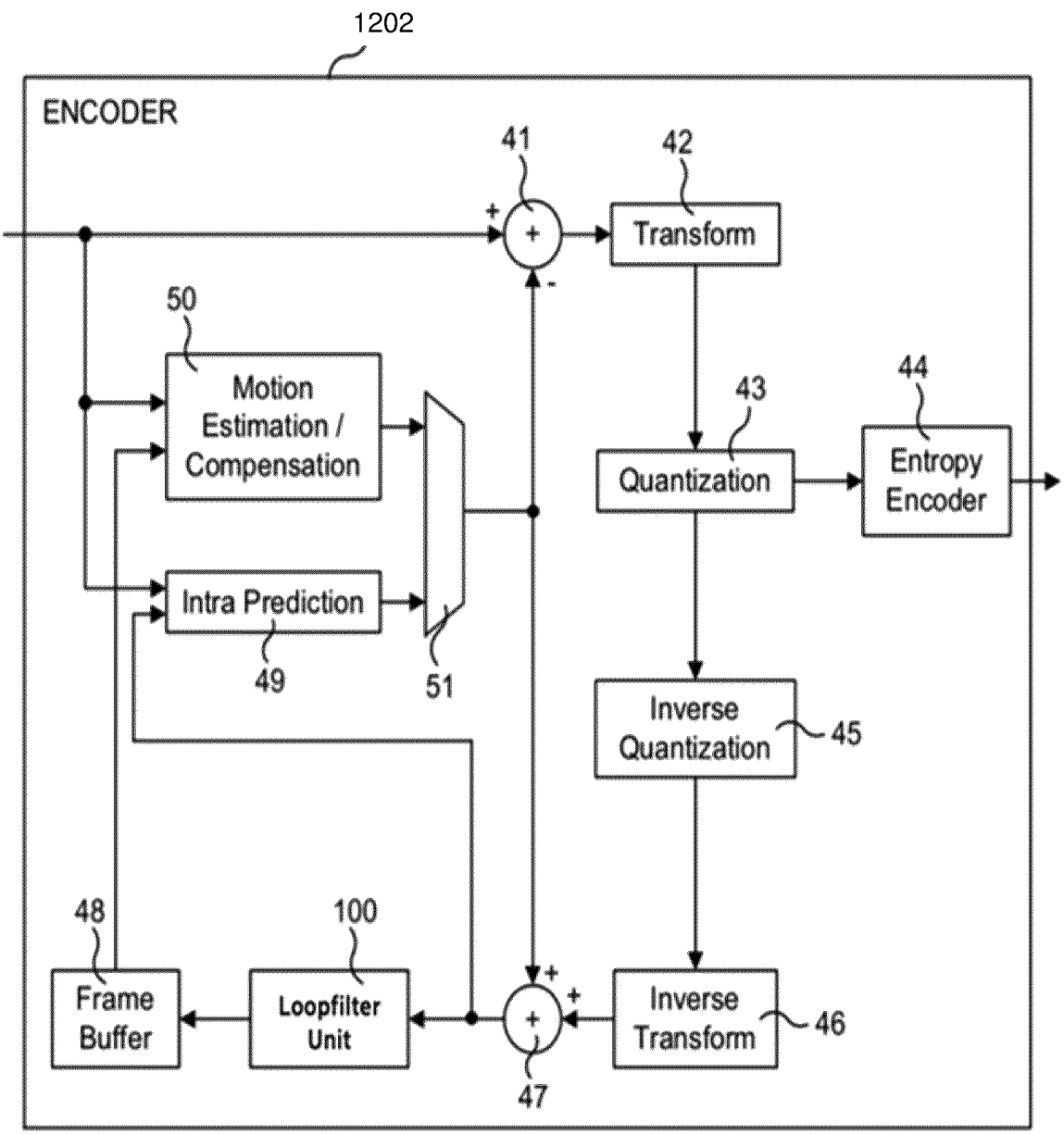
FIG. 13 illustrates an encoder according to an embodiment.

FIG. 13 is a schematic block diagram of encoder 1202. As illustrated in FIG. 13, The encoder 1202 takes in an original image and subtracts a prediction 41 that is selected 51 from either previously decoded samples ("Intra Prediction" 49) or samples from previously decoded frames stored in the frame buffer 48 through a method called motion compensation 50. The task of finding the best motion compensation samples is typically called motion estimation 50 and involves comparing against the original samples. After subtracting the prediction 41 the resulting difference is transformed 42 and subsequently quantized 43. The quantized results are entropy encoded 44 resulting in bits that can be stored, transmitted or further processed. The output from the quantization 43 is also inversely quantized 45 followed by an inverse transform 46. Then the prediction from 51 is added 47 and the result is forwarded to both the intra prediction unit 49 and to the Loopfilter Unit 100. The loop filter unit 100 may do deblocking, SAO and/or ALF filtering (including CC-ALF filtering). The result is stored in the frame buffer 48, which is used for future prediction. Not shown in FIG. 13 is that coding parameters for other blocks such as 42, 43, 49, 50, 51 and 100 also may also be entropy coded.

Figure 14:
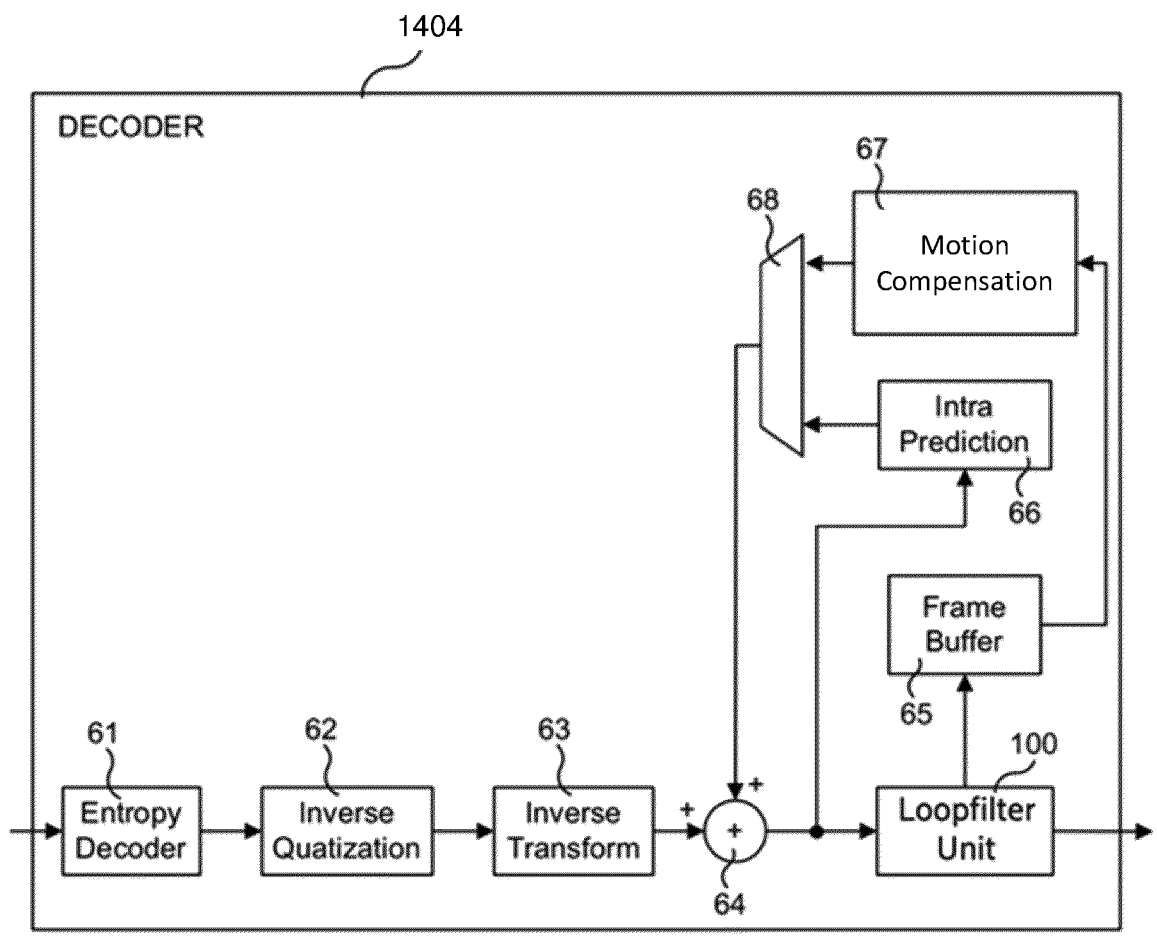
FIG. 14 illustrates a decoder according to an embodiment.

FIG. 14 is a corresponding schematic block diagram of decoder 1204 according to some embodiments. The decoder 1204 takes in entropy coded transform coefficients which are then decoded by decoder 61. The output of decoder 61 then undergoes inverse quantization 62 followed by inverse transform 63 to form a decoded residual. To this decoded residual, a prediction is added 64. The prediction is selected 68 from either a motion compensation unit 67 or from an intra prediction unit 66. After having added the prediction to the decoded residual 64, the samples can be forwarded for intra prediction of subsequent blocks. The samples are also forwarded to the loop filter unit 100, which may do deblocking, SAO processing, and/or ALF processing (including CC-ALF filtering). The output of the loop filter unit 100 is forwarded to the frame buffer 65, which can be used for motion compensation prediction of subsequently decoded images 67. The output of the loop filter unit 100 can also be output the decoded images for viewing or subsequent processing outside the decoder. Not shown in FIG. 14 is that parameters for other blocks such as 63, 67, 66 and 100 may also be entropy decoded. As an example, the coefficients for the ALF filter in block 100 may be entropy decoded.

The embodiments disclosed herein can be used to avoid generating artifacts from filtering of virtual boundaries in a still image or images of a video. This can be applied in encoder 1202 and/or decoder 1204. The approach is mainly described for virtual horizontal CTU boundaries but can be applicable also for virtual boundaries in general, such as for virtual vertical boundaries referring to columns instead of rows.

Figure 15:
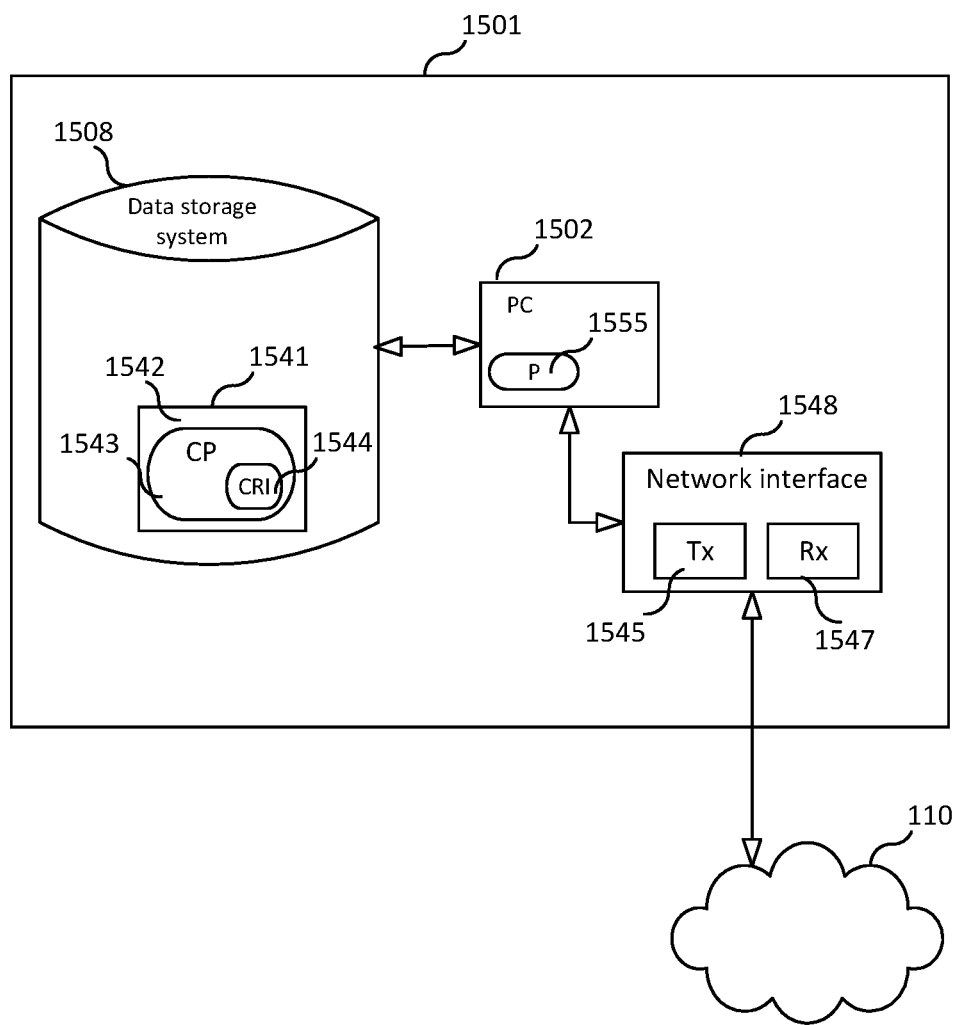
FIG. 15 illustrates an apparatus according to an embodiment.

FIG. 15 is a block diagram of an apparatus 1501 for implementing encoder 1202 or decoder 1204, according to some embodiments. That is, apparatus 1501 can be adapted to perform the methods disclosed herein. In embodiments where apparatus 1501 implements encoder 1202, apparatus 1501 may be referred to as "encoding apparatus 1501," and in embodiments where apparatus 1501 implements decoder 1204, apparatus 1501 may be referred to as a "decoding apparatus 1501." As shown in FIG. 15, apparatus 1501 may comprise: processing circuitry (PC) 1502, which may include one or more processors (P) 1555 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed; one or more network interfaces 1548 (which may be co-located or geographically distributed) where each network interface includes a transmitter (Tx) 1545 and a receiver (Rx) 1547 for enabling apparatus 1501 to transmit data to and receive data from other nodes connected to network 110 (e.g., an Internet Protocol (IP) network) to which network interface 1548 is connected; and one or more storage units (a.k.a., "data storage systems") 1508 which may be co-located or geographically distributed and which may include one or more non-volatile storage devices and/or one or more volatile storage devices. In embodiments where PC 1502 includes a programmable processor, a computer program product (CPP) 1541 may be provided. CPP 1541 includes a computer readable medium (CRM) 1542 storing a computer program (CP) 1543 comprising computer readable instructions (CRI) 1544. CRM 1542 may be a non-transitory computer readable medium, such as, magnetic media (e.g., a hard disk), optical media, memory devices (e.g., random access memory, flash memory), and the like. In some embodiments, the CRI 1544 of computer program 1543 is adapted such that when executed by PC 1502, the CRI causes apparatus 1501 to perform steps described herein (e.g., steps described herein with reference to the flow charts). In other embodiments, apparatus 1501 may be adapted to perform steps described herein without the need for code. That is, for example, PC 1502 may consist merely of one or more ASICs. Hence, the features of the embodiments described herein may be implemented in hardware and/or software.

Embodiment 0

Figure 1:
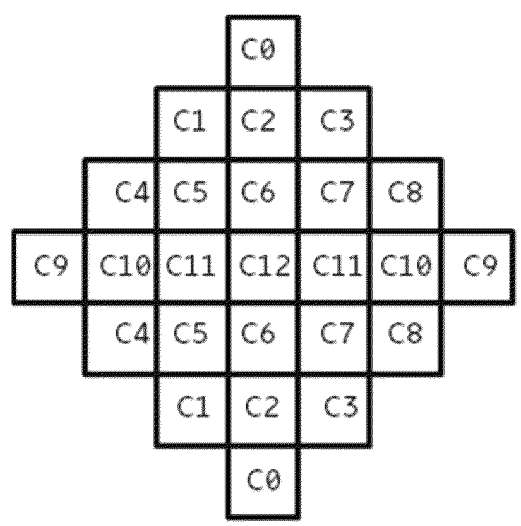
FIG. 1 illustrates filter coefficients.
Figure 2:
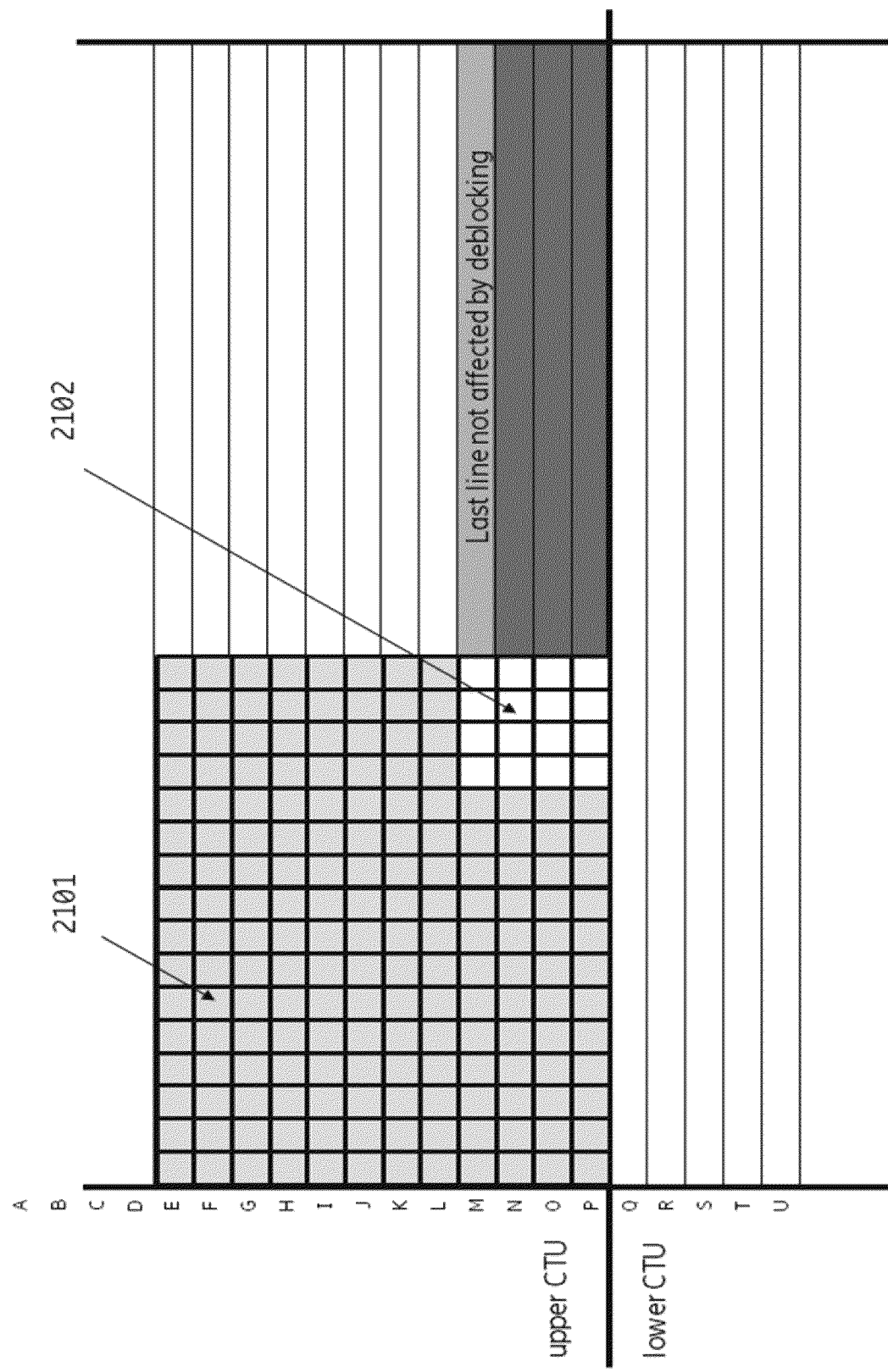
FIG. 2. shows how a 4×4 block is decoded after previous blocks have been decoded.
Figure 3:
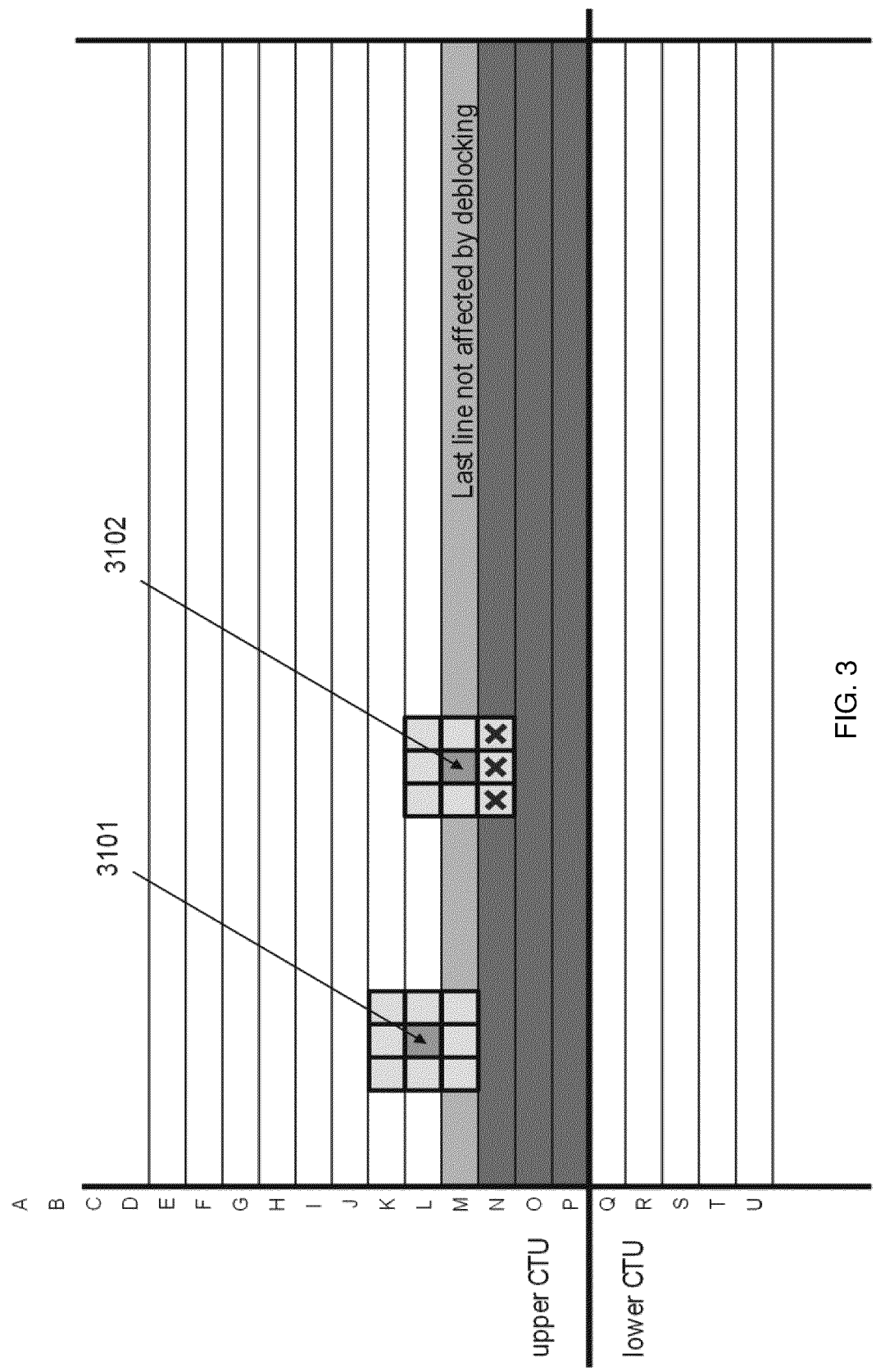
FIG. 3 shows that post-SAO samples needed to ALF-filter lines A-L are available.
Figure 4:
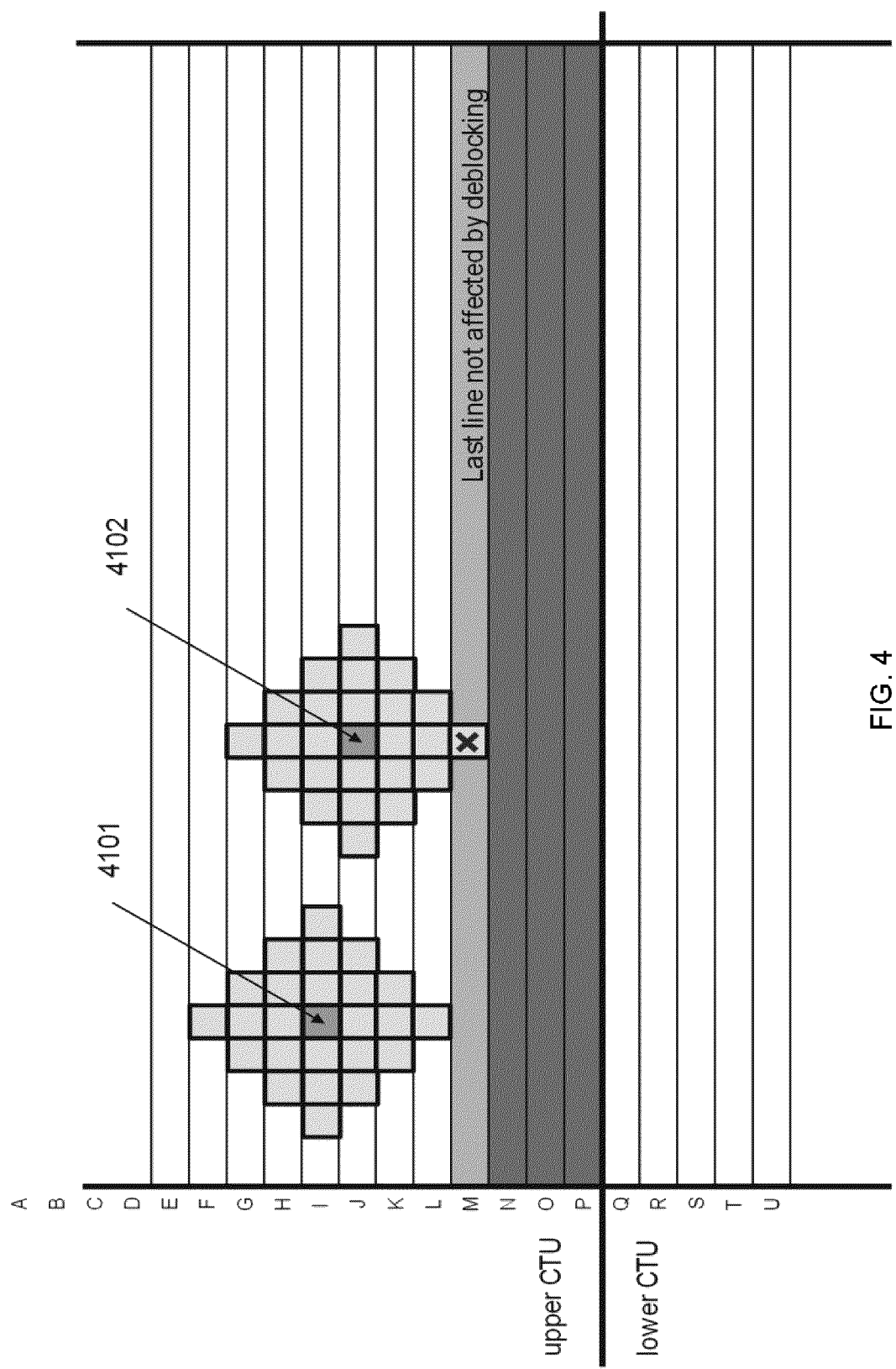
FIG. 4 shows that while filtering a sample on line I only requires samples for which SAO samples are already available, a sample on the next line M cannot be processed by ALF since SAO-processed samples (post-SAO samples) from line M through P are not available.
Figure 5:
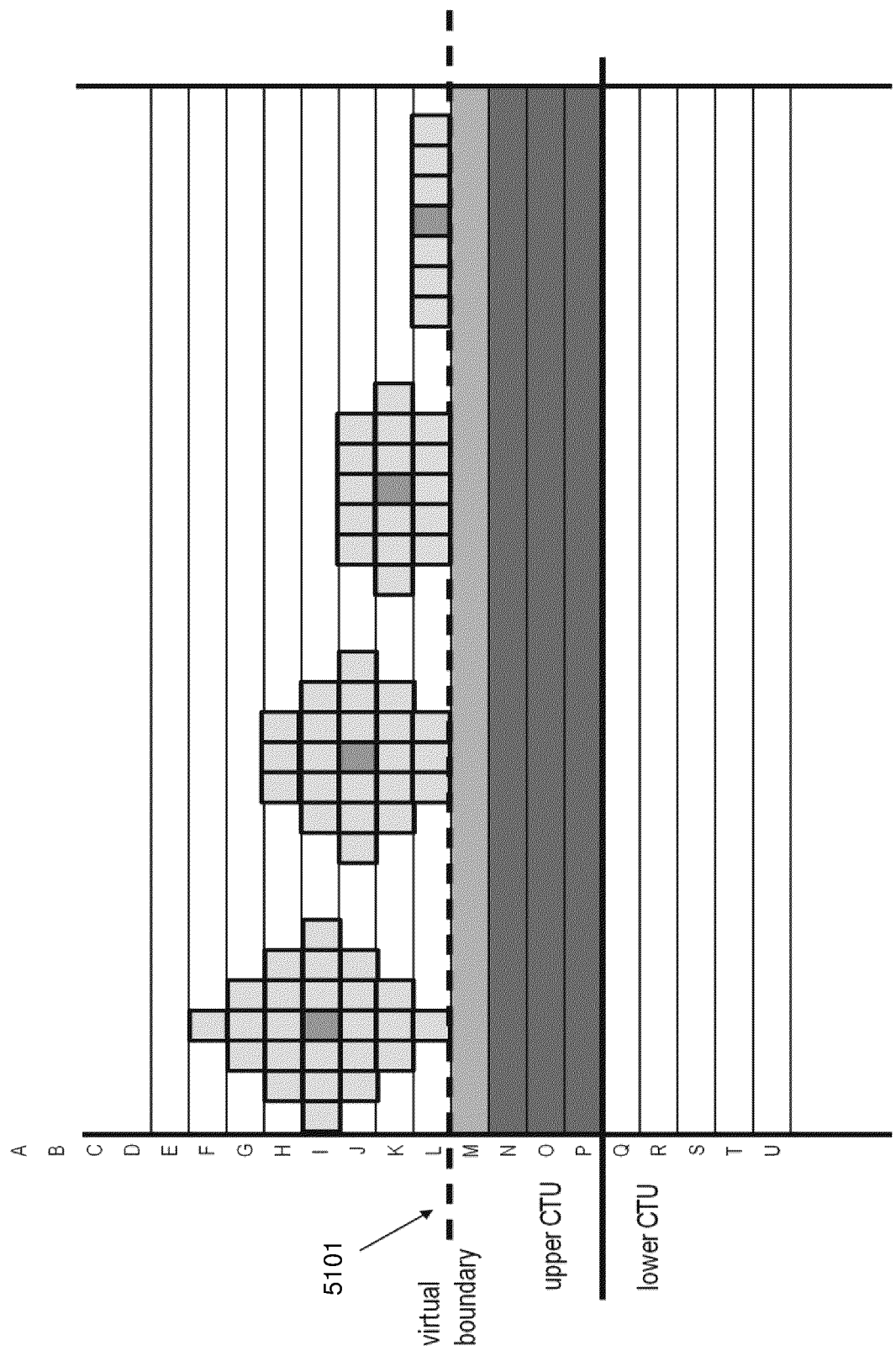
FIG. 5 shows that a virtual boundary is placed between line L and line M.
Figure 6:
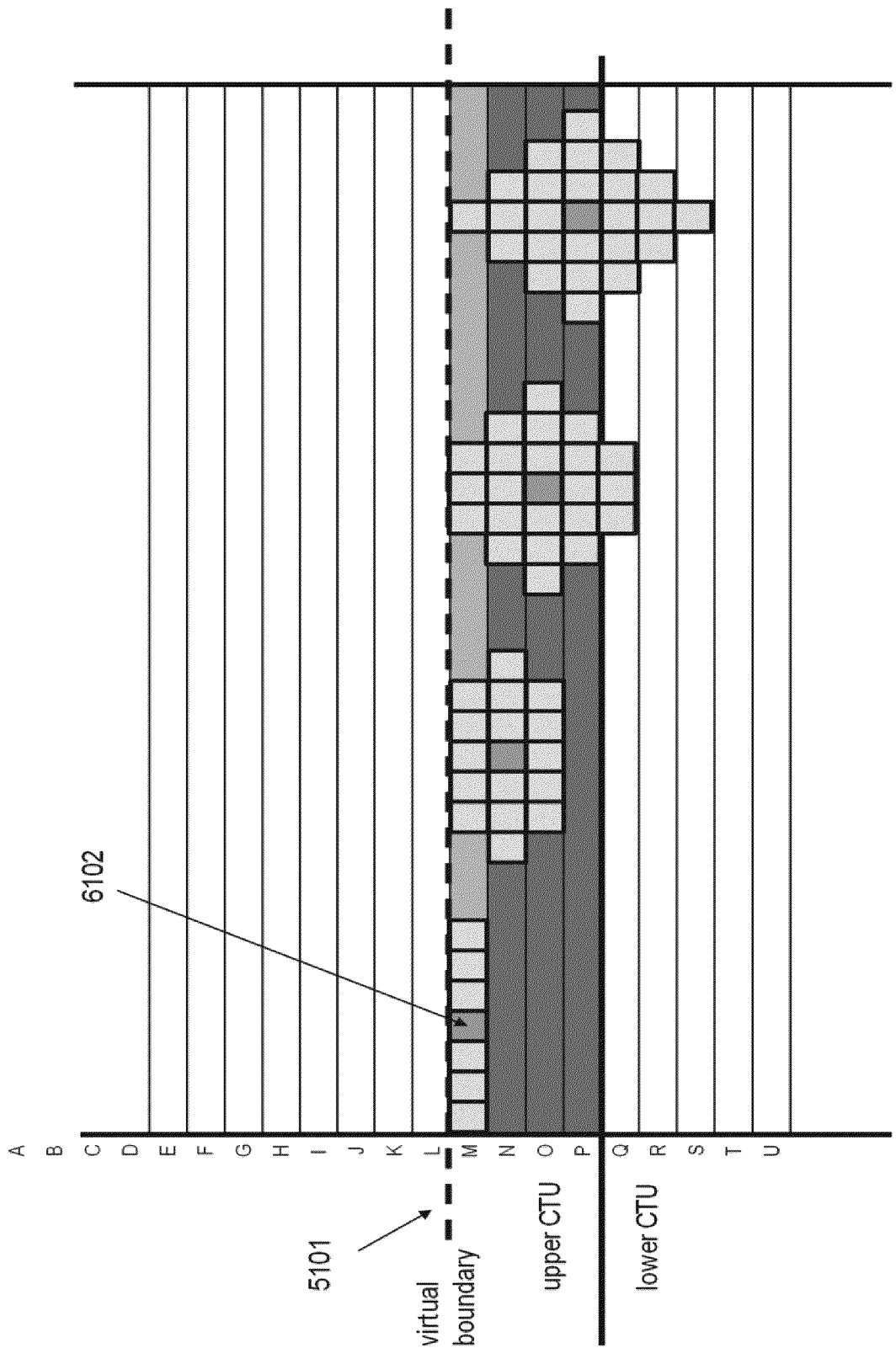
FIG. 6 shows a sample that will be filtered very strongly in the x-direction but not at all in the y-direction.
Figure 7:
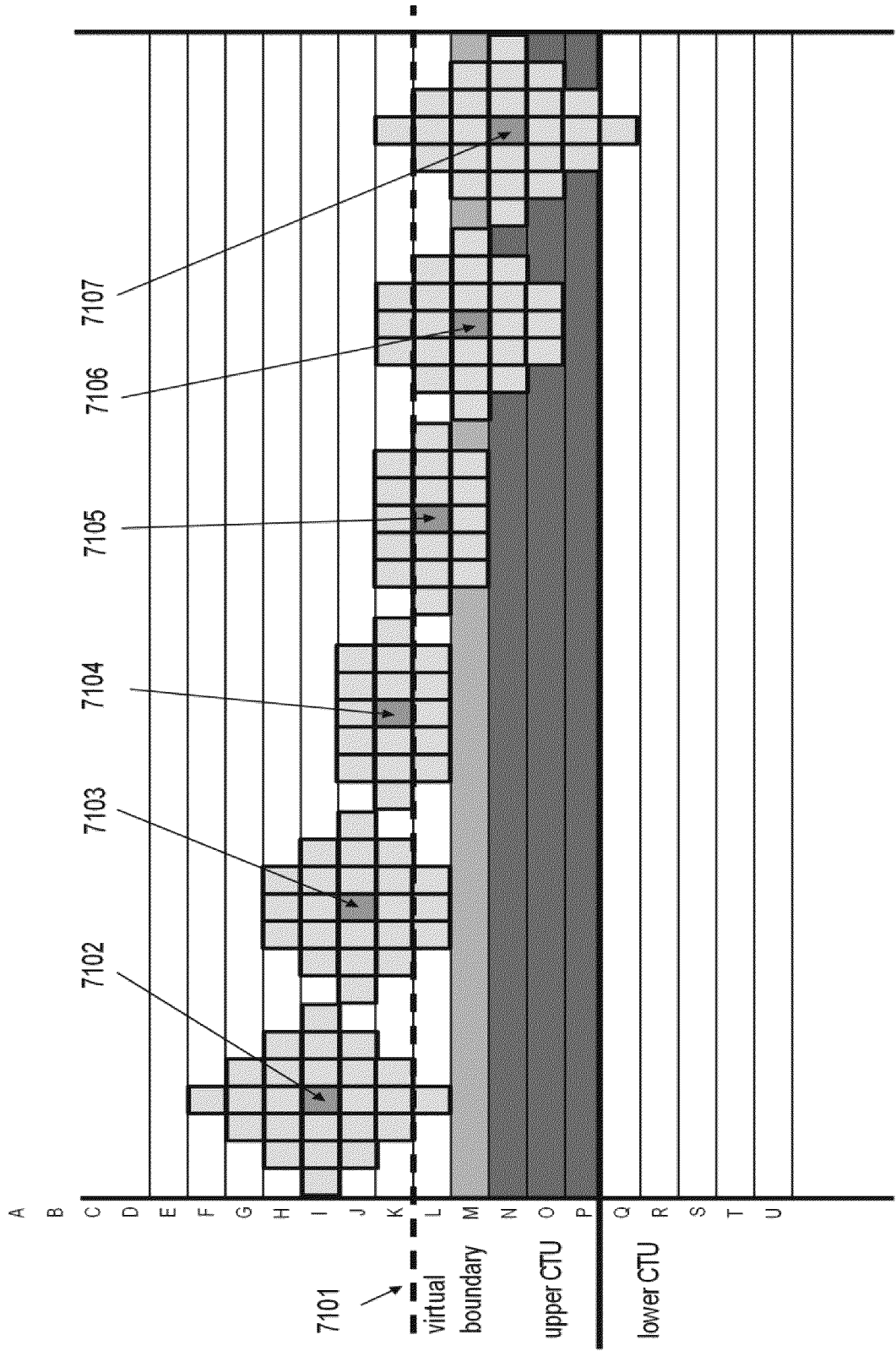
FIG. 7 shows that a virtual boundary is placed between line L and line K.

In one embodiment the following method is performed:

Step 1 (upper stage, same as "Current WC Solution") decodes the upper CTU. For details, see FIG. 2. This is the same as step 1 in the "before virtual boundary solution", "Current WC Solution" and "Alternative-1 Solution".

Step 2 (upper stage, same as "Current WC Solution") is repeated here for the convenience of the reader. This step will do SAO in all lines of the upper CTU except for lines M, N O and P. This is because, as shown in 3, while filtering a sample 3101 on line L only requires reading samples that will not be affected by deblocking, a sample 3102 on line M cannot be processed by SAO since deblocked samples from line N are not available.

Step 3 (upper stage) is the same as for the "Current WC Solution", i.e., it avoids accessing samples below the virtual boundary (8101 in FIG. 8) by making the filter smaller. This is can be seen for samples 8103, 8104 and 8105 in FIG. 8. This means that all lines up to and including line L can be filtered using ALF in the upper stage.

Step 4 (lower stage, same as "Current VVC Solution") will now do decoding of the lower CTU.

Step 5 (lower stage, same as "Current VVC Solution") will do deblocking of lines N-P in the upper CTU. To do that it will need to access lines M, N, O and P of pre-SAO data. That requires four line buffers.

Step 6 (lower stage, same as "Current VVC Solution") will do SAO of the missing lines from step two, i.e., lines M, N, O and P. To do that it needs to read line L of pre-SAO data. That is one extra line buffer.

Figure 8:
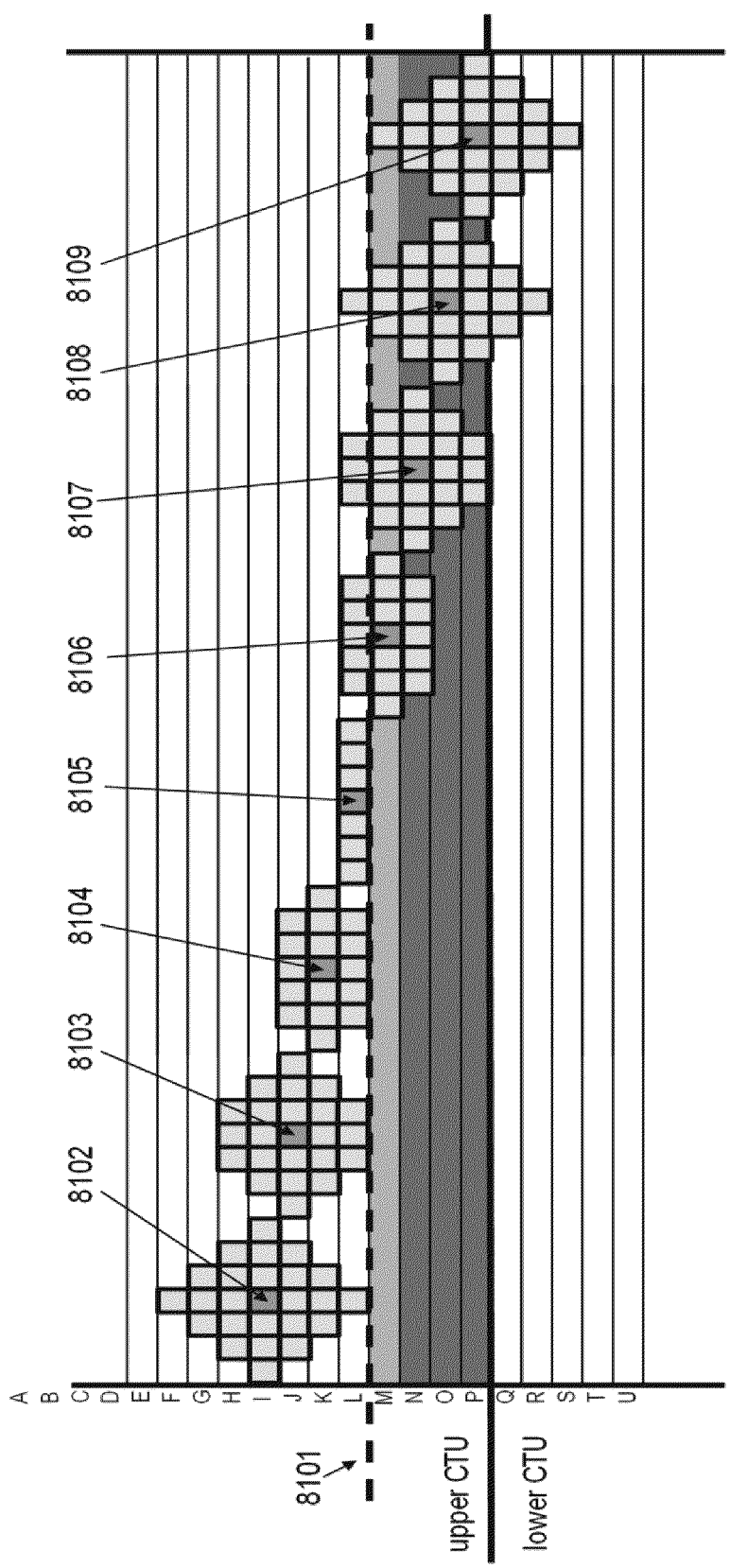
FIG. 8 shows that ALF-filtering lines M, N and O using samples from above a virtual boundary.

Step 7 (lower stage, new) will differ from previous solutions. As is shown in FIG. 8, this step will ALF-filter lines M, N and O using samples from above the virtual boundary 8101. As an example, when filtering sample 8106, the filter will access lines L, M and N, and when filtering sample 8108, the filter will access lines L M N O P Q and R. To do this it needs post-SAO samples from line L through R. Lines M through R are provided in step 6, but post-SAO samples from line L must have been previously stored in step 2. This means that one extra line buffer will be needed.

In summary, the following line buffers that will be needed is shown in the table below.

Line M with pre-SAO data (used by step 5);
Line N with pre-SAO data (used by step 5);
Line O with pre-SAO data (used by step 5);
Line P with pre-SAO data (used by step 5);
Line L with pre-SAO data (used by step 6);
Line L with post-SAO data (new, used by step 7).

It is proposed here to replace Table 45 in the VVC Draft Specification with a new Table 45 shown below:

New Table 45-Specification of y1, y2, y3 and alfShiftY according to the vertical luma sample position y and applyAlfLineBufBoundary

| Condition | alfShiftY | y1 | y2 | y3 |
|---|---|---|---|---|
| (y == (CtbSizeY − 5) && ( applyAlfLineBufBoundary == 1) | 10 | 0 | 0 | 0 |
| (y == (CtbSizeY − 6 \|\| y == CtbSizeY − 4) && (applyAlfLineBufBoundary == 1) | 7 | 1 | 1 | 1 |
| (y == (CtbSizeY − 7 \|\| y == CtbSizeY − 3) && (applyAlfLineBufBoundary == 1) | 7 | 1 | 2 | 2 |
| Otherwise | 7 | 1 | 2 | 3 |

The additional following change can be made to the VVC Draft Specification. One padding for the metric calculations at row y equal to CtbSizeY−4 can also be basically removed since the metric uses three samples: one from above current row, one from the current row and one from the row below the current row and with the proposal it is allowed to use samples from the adjacent row above the virtual boundary. Thus no padding of samples at y equal to CtbSizeY−5 is needed when the metric calculation is centered on y equal to CtbSizeY−4:

8.8.5.5 ALF boundary position derivation process

Inputs of this process are:
- a luma location (xCtb, yCtb ) specifying the top-left sample of the current luma coding tree block relative to the top left sample of the current picture,
- a luma location (x, y) specifying the current sample relative to the top-left sample of the current luma coding tree block.

Output of this process are:
- the left vertical boundary position clipLeftPos,
- the right vertical boundary position clipRightPos,
- the above horizontal boundary position clipTopPos,
- the below horizontal boundary position clipBottomPos,
- the top left boundary flag clipTopLeftFlag,
- the bottom right boundary flag clipBotRightFlag.

The variables clipLeftPos, clipRightPos, clipTopPos and clipBottomPos are
set equal to −128.
The variables clipTopLeftFlag and clipBotRightFlag are both set equal to 0.
The variable clipTopPos is modified as follows:
- If y − ( CtbSizeY − 5 ) is greater than or equal to 0, the variable clipTopPos is set equal to yCtb + CtbSizeY − 5.
- Otherwise, if VirtualBoundariesPresentFlag is equal to 1, and yCtb + y − VirtualBoundariesPosY[ n ] is greater than or equal to 0 and less than 3 for any n = 0..NumHorVirtualBoundaries − 1, the following applies:
    clipTopPos =
    VirtualBoundariesPosY[ n ]       (1510)
- Otherwise, if y is less than 3 and one or more of the following conditions are true, the variable clipTopPos is set equal to yCtb:
    - The top boundary of the current coding tree block is the top boundary of the tile, and loop_filter_across_tiles_enabled_flag is equal to 0.
    - The top boundary of the current coding tree block is the top boundary of the slice, and loop_filter_across_slices_enabled_flag is equal to 0.
    - The top boundary of the current coding tree block is the top boundary of the subpicture, and loop_filter_across_subpic_enabled_flag[ CurrSubpicIdx ] is equal to 0.

The variable clipBottomPos is modified as follows:
- IfVirtualBoundariesPresentFlag is equal to 1, VirtualBoundariesPosY[ n ] is not equal to pic_height_in_luma_samples − 1 or 0, and VirtualBoundariesPosY[ n ] − yCtb − y is greater than 0 and less than 5 for any n = 0..NumHorVirtualBoundaries − 1, the following applies:
    clipBottomPos =
    VirtualBoundariesPosY[ n ]       (1511)
- Otherwise, if CtbSizeY − 4 − y is greater than 0 and is less than 5, the variable clipBottomPos is set equal to yCtb + CtbSizeY − 4.
- Otherwise, if CtbSizeY − y is less than 5, and one or more of the following conditions are true, the variable clipBottomPos is set equal to yCtb + CtbSizeY:
    - The bottom boundary of the current coding tree block is the bottom boundary of the tile, and loop_filter_across_tiles_enabled_flag is equal 8.8.5.5 ALF boundary position derivation process to 0.
- The bottom boundary of the current coding tree block is the bottom boundary of the slice, and loop_filter_across_slices_enabled_flag is equal to 0.
- The bottom boundary of the current coding tree block is the bottom boundary of the subpicture, and loop_filter_across_subpic_enabled_flag[ CurrSubpicIdx ] is equal to 0.

The variable clipLeftPos is modified as follows:
- If VirtualBoundariesPresentFlag is equal to 1, and xCtb + x − VirtualBoundariesPosX[ n ] is greater than or equal to 0 and less than 3 for any n = 0..NumVerVirtualBoundaries − 1, the following applies:
    clipLeftPos =
    VirtualBoundariesPosX[ n ]   (1512)
- Otherwise, if x is less than 3, and one or more of the following conditions are true, the variable clipLeftPos is set equal to xCtb:
  - The left boundary of the current coding tree block is the left boundary of the tile, and loop_filter_across_tiles_enabled_flag is equal to 0.
  - The left boundary of the current coding tree block is the left boundary of the slice, and loop_filter_across_slices_enabled_flag is equal to 0.
  - The left boundary of the current coding tree block is the left boundary of the subpicture, and loop_filter_across_subpic_enabled_flag[ CurrSubpicIdx ] is equal to 0.

The variable clipRightPos is modified as follows:
- If VirtualBoundariesPresentFlag is equal to 1, and VirtualBoundariesPosX[ n ]− xCtb − x is greater than 0 and less than 5 for any n = 0..NumVerVirtualBoundaries − 1, the following applies:
    clipRightPos =
    VirtualBoundariesPosX[ n ]   (1513)
- Otherwise, if CtbSizeY − x is less than 5, and one or more of the following conditions are true, the variable clipRightPos is set equal to xCtb + CtbSizeY:
  - The right boundary of the current coding tree block is the right boundary of the tile, and loop_filter_across_tiless_enabled_flag is equal to 0.
  - The right boundary of the current coding tree block is the right boundary of the slice, and loop_filter_across_slices_enabled_flag is equal to 0.
  - The right boundary of the current coding tree block is the right boundary of the subpicture, and loop_filter_across_subpic_enabled_flag[ CurrSubpicIdx ] is equal to 0.

The variable clipTopLeftFlag and clipBotRightFlag are modified as following:
- If the coding tree block covering the luma position (xCtb, yCtb) and the codingtreeblockcoveringthelumaposition (xCtb − CtbSizeY, yCtb − CtbSizeY) belong to different slices, and loop_filter_across_slices_enabled_flag is equal to 0, clipTopLeftFlag is set equal to 1.
- If the coding tree block covering the luma position (xCtb, yCtb) and the codingtreeblockcoveringthelumaposition (xCtb + CtbSizeY, yCtb + CtbSizeY) belong to different slices, and loop_filter_across_slices_enabled_flag is equal to 0, clipBotRightFlag is set equal to 1.

Metric calculations in equations 1472 to 1474 need to pad the samples below the virtual boundary on row y equal to CtbSizeY−4 with samples from y equal to CtbSizeY-before metric calculations of row y equal to CtbSizeY−5, alternatively this can be described by modification of the equations for the two cases as follows:

When $v_{y4+j}$ is equal to CtbSizeY−5:

filtV[ i ][ j ] = Abs( ( recPicture $h_{x4 + i}$][$v_{y4 +j}$] << 1 ) − recPicture  (1472)
[ $h_{x4 + i}$ ][ $v_{y4 + j − 1}$ ] − recPicture[ $h_{x4 + i}$ ][ $v_{y4 + j + 1}$ ] )
filtD0[ i ][ j ] = Abs( ( recPicture[ $h_{x4 + i}$ ][ $v_{y4 +j}$ ] << 1 ) −  (1473)
recPicture
[ $h_{x4 + i − 1}$ ][ $v_{y4 + j − 1}$ ] − recPicture[ $h_{x4 + i + 1}$ ][ $v_{y4 + j}$ ] )
filtD1[ i ][ j ] = Abs( ( recPicture[ $h_{x4 + i}$ ][ $v_{y4 +j}$ ] << 1 ) −  (1474)
recPicture
[ $h_{x4 + i + 1}$ ][ $v_{y4 + j − 1}$ ] − recPicture[ $h_{x4 + i − 1}$ ][ $v_{y4 +j}$ ] )

Embodiment 1

In this embodiment, which is based on Embodiment 0, the proposed solution is used as described above for luma. Two line buffers of 10 bits each will be used, one for line L with pre-SAO data (10 bits per sample) and one for line L with post-SAO data (10 bits per sample).

The cost for embodiment 1 is therefore one extra line buffer, or 6 line buffers in total.

Embodiment 2 (Also Based on Embodiment 0)

This embodiment makes use of the fact that a SAO offset is always a number between −31 and 31, inclusive. This means that it can be stored using a 6-bit two-complement number, since these are capable of storing numbers in the range [−32, 31]. In this embodiment, only line L with pre-SAO data is stored, along with a row of SAO offsets for the samples in L. In step 7, when the decoder wants access to the post-SAO data of line L, it is created on the fly using postSAOsample[$x$]=Clip3(0,(1<<BitDepth),pre-SAOsample[$x$]+SAOoffset[$x$]), where preSAOsample[x] is the line buffer that stores pre-SAO data, BitDepth is 10 for 10-bit data, SAOoffset[x] is the new line buffer that stores the SAO offset using 6 bits, Clip3(a, b, x) clips the value x so that it is in the range [a, b], and postSAO sample is the line L with post-SAO data that is required by step 7.

(Note that the pre-SAO data of line L is available since it is used by step 6.)

This is going to be equivalent to the post-SAO sample from line L, since that value has been calculated using the same formula (from draft 8 of the VVC standard)

saoPicture[ $xS_i$ ][ $yS_j$ ] = Clip3( 0, ( 1 << BitDepth ) − 1,
recPicture[ $xS_i$ ][ $yS_j$ ] +
SaoOffsetVal[ cIdx ][ rx ][ ry ][ edgeIdx ] )
(1450)

In summary, the following line buffers will be needed:

Line M with pre-SAO data (used by step 5), stored as 10 bits
Line N with pre-SAO data (used by step 5), stored as 10 bits
Line O with pre-SAO data (used by step 5), stored as 10 bits
Line P with pre-SAO data (used by step 5), stored as 10 bits
Line L with pre-SAO data (used by step 6), stored as 10 bits
Line L with SAO offset data (new, used by step 7), stored as 6 bits Embodiment 3

In this embodiment the "Current VVC Solution" for chroma samples is used but embodiment 1 or embodiment 2 for luma samples.

The five previous line buffers used in the "Current VVC Solution" need to store luma (at full resolution) and chroma (at half resolution) for 4:2:0 video data. As an example, with the "Current VVC Solution" a decoder decoding a 1920× 1080 video signal would need 5 line buffers of size 1920 samples for luma, 5 line buffers of size 1920/2=960 samples for Cb and 5 line buffers of size 960 samples for Cr. In total this would be 5*1920+5*960*2=10*1920=19200 samples of 10 bits or 10*(5*1920+5*960*2)/8=24000 bytes. Embodiment 3 would not need extra buffers for Cb and Cr and would thus need 6*1920+5*960*2=21120 samples which equals 21120*10/*=26400 bytes. Thus, the amount of memory only increases by a factor of 26400/24000=1.1, i.e., it only increases by 10%.

Embodiment 4

In this embodiment, embodiment 1 or embodiment 2 is used for both luma samples and for chroma samples. Thus, the number of samples needed would be 6*1920+ 6*960*2=23040 samples or 28800 bytes. Therefore, the amount of memory only increases by a factor of 28800/ 24000=1.2, i.e., it only increases by 20%.

It is proposed here to replace Table 46 in the VVC Draft Specification with a new Table 46 shown below:

NEW TABLE 46

Specification of y1, y2 and alfShiftC according to the vertical chroma sample position y and applyAlfLineBufBoundary

| Condition | alfShiftC | y1 | y2 |
|---|---|---|---|
| ( y = = ctbHeightC − 3 ) && ( applyAlfLineBufBoundary = = 1 ) | 10 | 0 | 0 |
| ( y = = (ctbHeightC − 2 \|\| y = = ctbHeightC − 4 ) && ( applyAlfLineBufBoundary = = 1 ) | 7 | 1 | 1 |
| Otherwise | 7 | 1 | 2 |

Embodiment 5

In another embodiment, instead of crossing the virtual boundary only when filtering samples below the virtual boundary, the boundary is crossed only when filtering samples above the virtual boundary.

Figure 9:
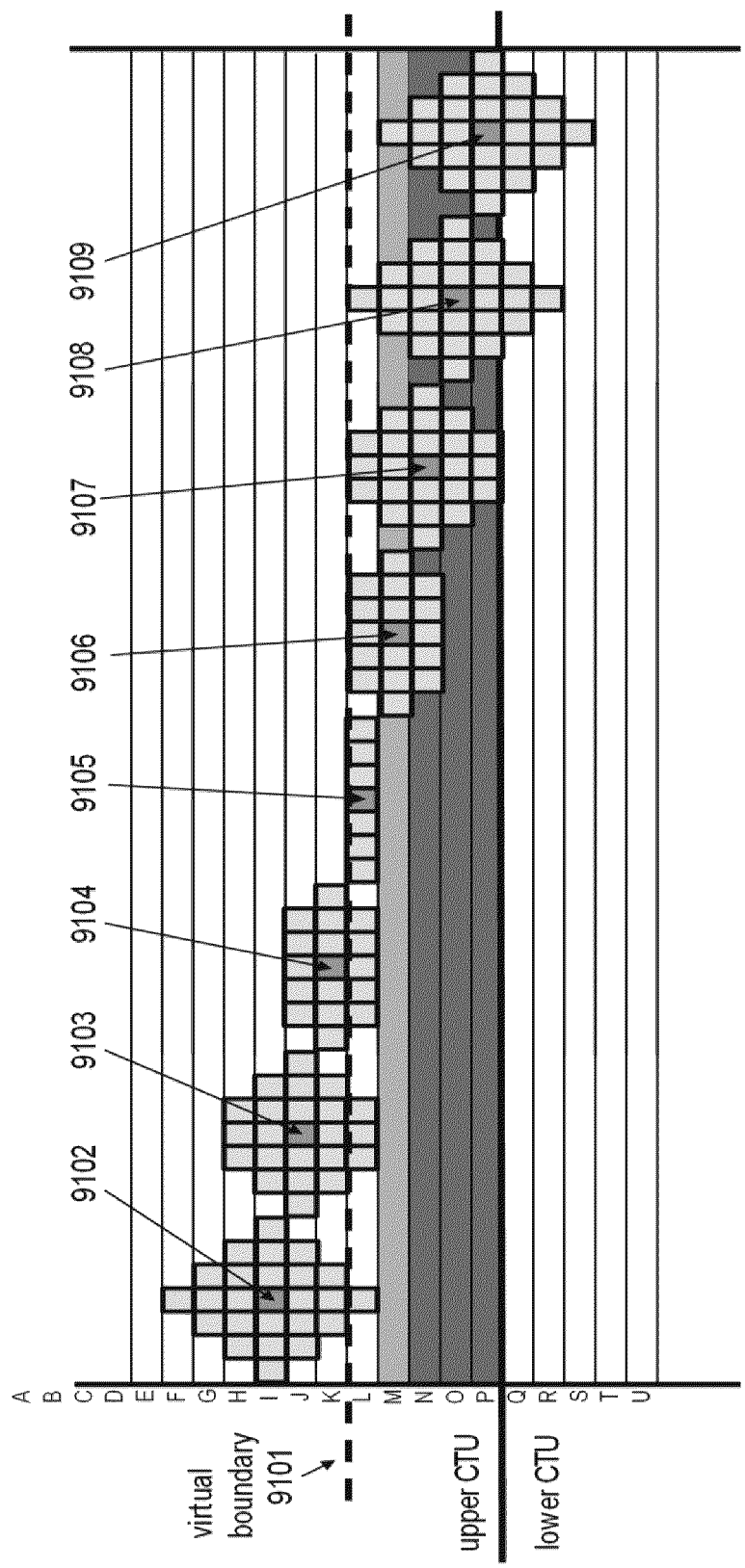
FIG. 9 illustrates an embodiment.

This approach can be seen in FIG. 9.

Steps 1 and 2 (upper stage) are carried out the same way as for the "No Virtual Boundary Solution", which is also the same as for the "Current VVC Solution". As is shown in 3, this means that post-SAO data is available for lines A through L.

Step 3 (upper stage) is the same as for the "Alternative-1 Solution". The virtual boundary (9101 in FIG. 9) has been moved one line upwards compared to the "Current VVC Solution". Samples 9102, 9103 and 9104 are processed in this step. It is possible for them to cross the line, since the post-SAO data from L line on the other side of the virtual line is available.

Step 4 (lower stage, same as "Current VVC Solution") will now do decoding of the lower CTU.

Step 5 (lower stage, same as "Current VVC Solution") will do deblocking of lines N-P in the upper CTU. To do that it will need to access lines M, N, O and P of pre-SAO data. That is four line buffers.

Step 6 (lower stage, same as before) will do SAO of the missing lines from step two, i.e., lines M, N, O and P. To do that it needs to read line L of pre-SAO data. That is one extra line buffer.

Step 7 (lower stage) will ALF-filter the lines below the virtual boundary, e.g., samples 9105, 9106, 9107, 9108 and 9109 as shown in FIG. 9. Crossing of the virtual boundary is not necessary when filtering these samples, due to the shape of the filter as is seen in FIG. 9. Filtering 9105 requires post-SAO data from line L. That is one extra line buffer.

One may observe that embodiment 5 may be equivalent to embodiment 1. As an example, if one compares the filter kernels in FIG. 8 with the filter kernels in FIG. 9, they are placed in the same positions and have the same shape, meaning that they read exactly the same samples. They may therefore generate the same output.

Embodiment 6

As one could see in step 7 of the "Alternative-1 Solution," two extra line buffers were needed for that solution.

In summary, the "Alternative-1 Solution" will need the following line buffers:

Line M with pre-SAO data (used by step 5)
Line N with pre-SAO data (used by step 5)

-continued

Line O with pre-SAO data (used by step 5)
Line P with pre-SAO data (used by step 5)
Line L with pre-SAO data (used by step 6)
Line K with post-SAO data (used by step 7)
Line L with post-SAO data (used by step 7)

This is 7 line buffers. However, line L is required twice, once for pre-SAO data and once for post-SAO data. Hence, the post-SAO line for line L can be removed and instead store the SAO offset. Since this is between −31 and 31 inclusive, it can be stored using 6 bits. Embodiment 6 takes advantage of this solution, and instead use the following line buffers:

Line M with pre-SAO data (used by step 5), 10 bits
Line N with pre-SAO data (used by step 5), 10 bits
Line O with pre-SAO data (used by step 5), 10 bits
Line P with pre-SAO data (used by step 5), 10 bits
Line L with pre-SAO data (used by step 6), 10 bits
Line K with post-SAO data (used by step 7), 10 bits
Line L with SAO offset data (used by step 7), 6 bits Thus in this embodiment, the "Alternative-1 Solution" can be implemented with just 1.6 extra line buffers instead of 2 extra line buffers.

Embodiment 7

Figure 16:
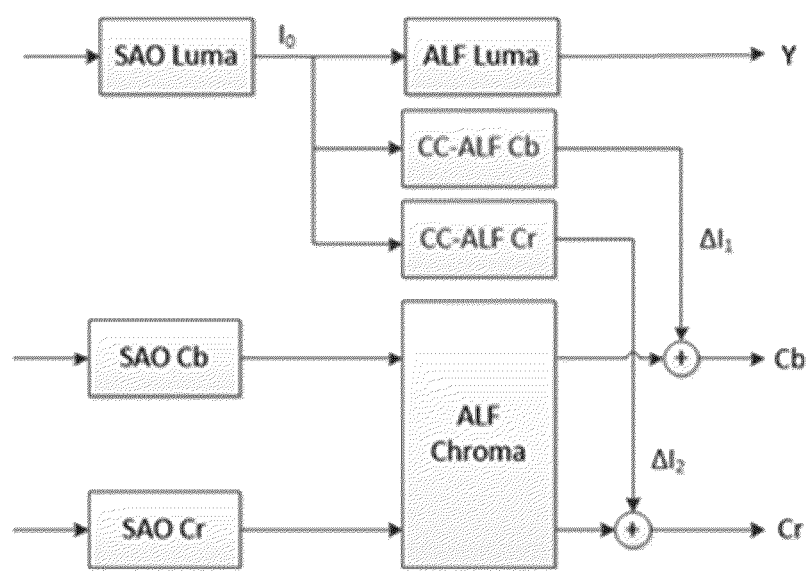
FIG. 16 illustrates the placement of CC-ALF with respect to other loop filters.

In JVET-00636, a tool called the Cross-Component Adaptive Loop Filter (CC-ALF) was first proposed as part of the adaptive loop filter process. The CC-ALF was studied in a Core Experiment in JVET-P meeting and JVET-Q meeting. The CC-ALF makes use of luma sample values to refine each chroma component. The luma sample values were reconstructed luma samples after SAO and before luma ALF operations. A linear, diamond shaped filter is applied to the luma samples for each chroma component i to derive a residual correction $\Delta I_i(x,y)$. The residual correction is applied to the reconstructed chroma sample after ALF chroma to derive the reconstructed chroma sample value. FIG. 16 illustrates the placement of CC-ALF with respect to other loop filters.

In JVET-P2025, description of Core experiment 5 (CE5): Cross component Adaptive Loop filtering, the CC-ALF specifies an anchor CC-ALF (name as "CE anchor" in the following of the current invention) for core experiment test, which includes the following properties: 1) Filter shape is a 3×4 diamond with 8 unique coefficients; 2) Filter coefficient dynamic range between [−32, 31], inclusive; 3) Filter selection to performed at the CTU level with support for a maximum of 4 filters; 4) Symmetric line selection is used at virtual boundary; 5) Temporal layer coefficient buffers are not used; and 6) Residual correction is clipped to $-2^{BitDepthC-1}$ to $2^{BitDepthC-1}-1$, inclusive.

Figure 17:
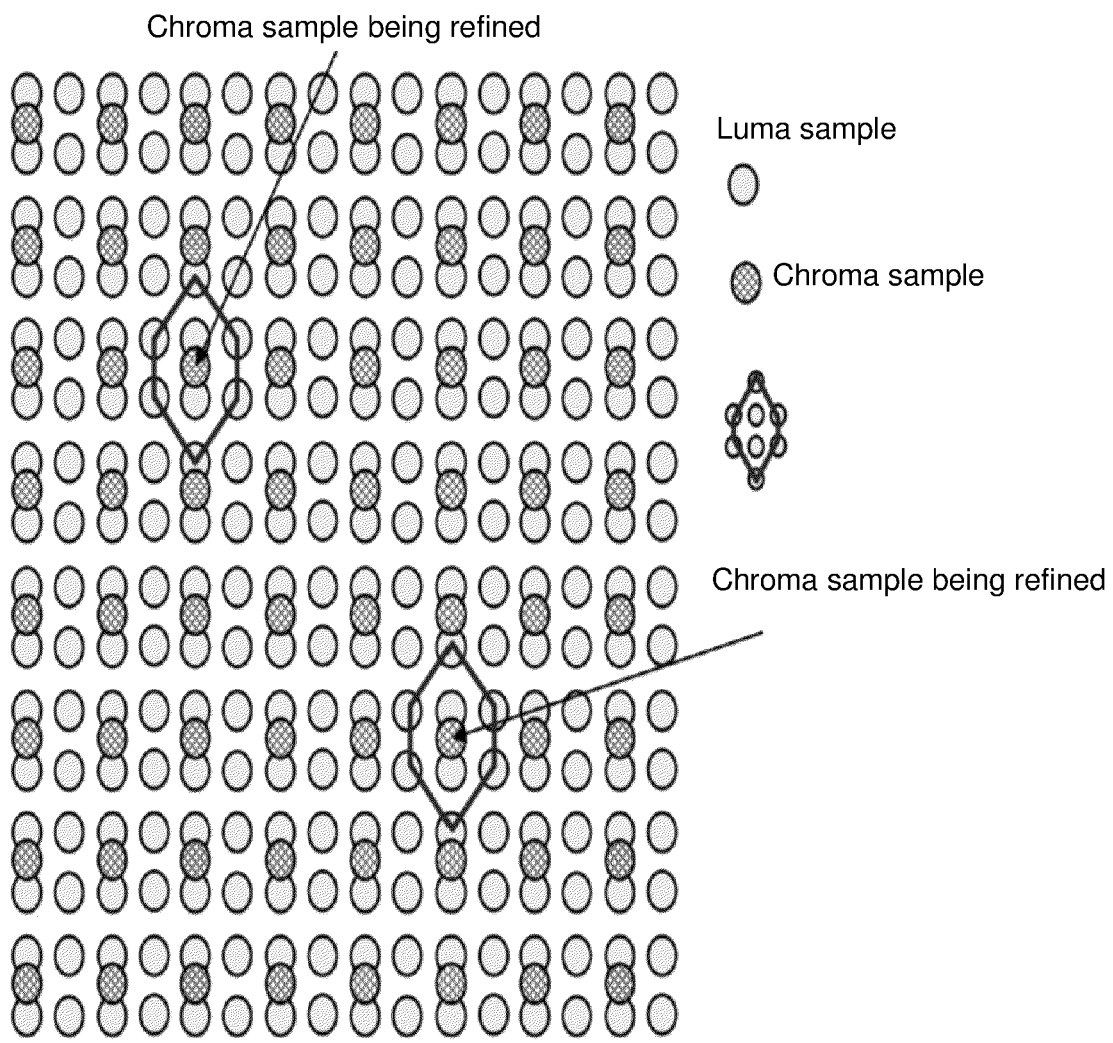
FIG. 17 shows the CE anchor CC-ALF filter shape.

The CE anchor applies an 8-tap diamond CC-ALF filter to the co-located luma samples centered at the chroma sample to be refined. FIG. 17 shows the CE anchor CC-ALF filter shape.

Figure 18:
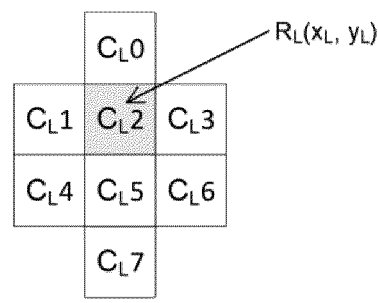
FIG. 18 shows the 8-tap 3×4 diamond CC-ALF filter coefficient respect to the luma sample location.

Assume the $R_C(x_C, y_C)$ is the ALF chroma reconstructed chroma sample to be refined by CC-ALF, where the $(x_C, y_C)$ specifies the position of the chroma sample in the current picture. The co-located luma sample to the $R_C(x_C, y_C)$ is $R_L(x_L, y_L)$, where $(x_L, y_L)$ specifies the position i of the co-located luma sample in the current picture. The 8 luma samples to be filtered by CC-ALF are $R_L(x_L-1, y_L)$, $R_L(x_L, y_L-1)$, $R_L(x_L, y_L)$, $R_L(x_L-1, y_L+1)$, $R_L(x_L+1, y_L-1)$, $R_L(x_L+1, y_L)$, $R_L(x_L+1, y_L+1)$, $R_L(x_L+2, y_L)$. FIG. 18 shows the 8-tap 3×4 diamond CC-ALF filter coefficient respect to the luma sample location.

The residual correction $\Delta I_i(x,y)$ is calculated in the following way:

$$\Delta I_i(x,y)=(C_L0*R_L(x_L-1,y_L)+C_L1*R_L(x_L,y_L-1)+\\C_L2*R_L(x_L,y_L)+C_L3*R_L(x_L,y_L+1)+C_L4*R_L(x_L+1,y_L-1)+C_L5*R_L(x_L+1,y_L)+C_L6*R_L(x_L+1,y_L+1)+\\C_L7*R_L(x_L+2,y_L)+2^{shiftFactor-1})>>\text{shiftFactor} \quad (\text{Eqn 4})$$

where, $C_Li$ specifies the CC-ALF filter coefficients, i ranges from 0 to 7, each coefficient but $C_L2$ is trained in the encoder side.

The CC-ALF filter coefficient $C_Li$ has a value ranges between [−32, 31], inclusive. This value range is also known as dynamic range.

$C_{L2}$ $(-1)*(C_L0+C_L1+C_L3+C_L4+C_L5+C_L6+C_L7)$ with clip to a value ranges between [−32, 31], inclusive.

shiftFactor=coefficient bit scale+(BitDepthy−BitDepthc), where in CE anchor, coefficient bit scale is equal to 7.

The residual correction $\Delta I_i(x,y)$ is clipped to a value range between $[-2^{BitDepthC-1}, 2^{BitDepthC-1}-1]$, inclusive. The CC-ALF refined chroma sample $R_F(x_C, y_C)$ is then derived as: $R_F(x_C,y_C)=\Delta I_i(x,y)+R_C(x_C,y_C)$, with clip to a value range between $[0, 2^{BitDepthC}-1]$, inclusive.

The CC-ALF filter coefficient is coded with 6 bits fix length code which can represent value ranges from 0 to 63. The encoded/decoded CC-ALF coefficient names as $D_L(i)$, which i ranges from 0, 1, 2 to 7. The CC-ALF coefficient $C_L(i)$ is equal to $D_L(i)-32$.

Similar to ALF, CC-ALF also use virtual boundary processing by means of symmetric padding for the filtering of luma samples to avoid increasing the line buffer requirements for luma.

In this embodiment CC-ALF can also use the luma row above the virtual boundary in same spirit as other embodiments for ALF.

Section 8.8.5.7 of the VVC Draft Specification describes a cross-component filtering process. The text of this section is reproduced below.

| 8.8.5.7 Cross-component filtering process |
|---|
| Inputs of this process are:<br>  – a reconstructed luma picture sample array recPicture$_L$ prior to the luma adaptive loop filtering process,<br>  – a filtered reconstructed chroma picture sample array alfPicture$_C$,<br>  – a chroma location ( xCtbC, yCtbC ) specifying the top-left sample of the current chroma coding tree block relative to the top-left sample of the current picture,<br>  – a CTB width ccAlfWidth in chroma samples,<br>  – a CTB height ccAlfHeight in chroma samples,<br>  – cross-component filter coefficients CcAlfCoeff[ j ], with j = 0..6.<br>Output of this process is the modified filtered reconstructed chroma picture sample array ccAlfPicture.<br>For the derivation of the filtered reconstructed chroma samples ccAlfPicture[ xCtbC + x ][ yCtbC + y ], each reconstructed chroma sample inside the current chroma block of samples alfPicture$_C$[ xCtbC + x ][ yCtbC + y ] with x = 0..ccAlfWidth − 1, y = 0..ccAlfHeight − 1, is filtered as follows:<br>  – The luma location ( xL, yL ) corresponding to the current chroma sample at chroma location ( xCtbC + x, yCtbC + y ) is set equal to ( ( xCtbC + x ) * SubWidthC, ( yCtbC + y ) * SubHeightC ).<br>  – The luma locations ( h$_{x + i}$, v$_{y + j}$ ) with i = −1..1, j = −1..2 inside the array recPicture$_L$ are derived as follows:<br>    h$_{x + i}$ = Clip3( 0, pic_width_in_luma_samples − 1, xL + i )   (1528)<br>    v$_{y + j}$ = Clip3( 0, pic_height_in_luma_samples − 1, yL + j )   (1529)<br>  – The variables clipLeftPos, clipRightPos, clipTopPos, clipBottomPos, clipTopLeftFlag and clipBotRightFlag are derived by invoking the ALF boundary position derivation process as specified in clause 8.8.5.5 with ( xCtbC * SubWidthC, yCtbC * SubHeightC ) and ( x * SubWidthC, y *SubHeightC ) as inputs.<br>  – The variables h$_{x + i}$ and v$_{y + j}$ are modified by invoking the ALF sample padding process as specified in clause 8.8.5.6 with ( xCtbC * SubWidthC, yCtbC * SubHeightC ), (h$_{x + i}$, v$_{y + j}$), the variable isChroma set equal to 0, clipLeftPos, clipRightPos, clipTopPos, clipBottomPos, clipTopLeftFlag and clipBotRightFlag as input.<br>  – The variable applyAlfLineBufBoundary is derived as follows:<br>    – If the bottom boundary of the current coding tree block is the bottom boundary of current picture and pic_height_in_luma_samples − yCtbC * SubHeightC is less then or equal to CtbSizeY − 4, applyAlfLineBufBoundary is set equal to 0. |

-continued

8.8.5.7 Cross-component filtering process

- Otherwise, applyAlfLineBufBoundary is set equal to 1.
- The vertical sample position offsets yP1 and yP2 are specified in Table 47 according to the vertical luma sample position (y * SubHeightC) and applyAlfLineBufBoundary.
- The variable curr is derived as follows:
  curr = alfPicture$_C$[ xCtbC + x ][ yCtbC + y ]     (1530)
- The array of cross-component filter coefficients f[ j ] is derived as follows with j = 0..6:
  f[ j ] = CcAlfCoeff[ j ]     (1531)
- The variable sum is derived as follows:
  sum = f[ 0 ] * ( recPicture$_L$[ h$_x$ ][ v$_{y\ -\ yP1}$ ] − recPicture$_L$[ h$_x$ ][ v$_y$ ] ) +
  f[ 1 ] * ( recPicture$_L$[ h$_{x-1}$ ][ v$_y$ ] − recPicture$_L$[ h$_x$ ][ v$_y$ ] ) +
  f[ 2 ] * ( recPicture$_L$[ h$_{x+1}$ ][ v$_y$ ] − recPicture$_L$[ h$_x$ ][ v$_y$ ] ) +     (1532)
  f[ 3 ] * ( recPicture$_L$[ h$_{x-1}$ ][ v$_{y+yP1}$ ] − recPicture$_L$[ h$_x$ ][ v$_y$ ] ) +
  f[ 4 ] * ( recPicture$_L$[ h$_x$ ][ v$_{y+yP1}$ ] − recPicture$_L$[ h$_x$ ][ v$_y$ ] ) +
  f[ 5 ] * ( recPicture$_L$[ h$_{x+1}$ ][ v$_{y+yP1}$ ] − recPicture$_L$[ h$_x$ ][ v$_y$ ] ) +
  f[ 6 ] * ( recPicture$_L$[ h$_x$ ][ v$_{y\ +\ yP2}$ ] − recPicture$_L$[ h$_x$ ][ v$_y$ ] )
  scaledSum = Clip3( −( 1 << ( BitDepth − 1 ) ), ( 1 << ( BitDepth − 1 ) ) − 1, ( sum + 64 ) >> 7 )     (1533)
  sum = curr + scaledSum     (1534)
- The modified filtered reconstructed chroma picture sample ccAlfPicture[ xCtbC + x ][ yCtbC + y ] is derived as follows:
  ccAlfPicture[ xCtbC + x ][ yCtbC + y ] = Clip3( 0, ( 1 << BitDepth ) − 1, sum )     (1535)

The above mentioned Table 47 controls the padding for CC-ALF and is reproduced below:

TABLE 47

Specification of yP1 and yP2 according to the vertical luma sample position ( y * subHeightC ) and applyAlfLineBufBoundary

| Condition | yP1 | yP2 |
|---|---|---|
| ( y * subHeightC = = CtbSizeY − 5 \|\| y * subHeightC = = CtbSizeY − 4 ) && applyAlfLineBufBoundary = = 1 | 0 | 0 |
| ( y * subHeightC = = CtbSizeY − 6 \|\| y * subHeightC = = CtbSizeY − 3 ) && applyAlfLineBufBoundary = = 1 | 1 | 1 |
| Otherwise | 1 | 2 |

It is proposed here to replace this Table 47 in the VVC Draft Specification with a new table 47 shown below.

NEW TABLE 47

Specification of yP1 and yP2 according to the vertical luma sample position ( y * subHeightC ) and applyAlfLineBufBoundar

| Condition | yP1 | yP2 |
|---|---|---|
| ( y * subHeightC = = CtbSizeY − 5 ) && applyAlfLineBufBoundary = = 1 | 0 | 0 |
| ( y * subHeightC = = CtbSizeY − 6 \|\| y * subHeightC = = CtbSizeY − 4 ) && applyAlfLineBufBoundary = = 1 | 1 | 1 |
| Otherwise | 1 | 2 |

Embodiment 8

In one embodiment the following method is performed:

Step 1 (upper stage, same as "Current VVC Solution") decodes the upper CTU. For details, see FIG. 2. This is the same as step 1 in the "before virtual boundary solution", "Current VVC Solution" and "Alternative-1 Solution".

Step 2 (upper stage, same as "Current VVC Solution") is repeated here for the convenience of the reader. This step will do SAO in all lines of the upper CTU except for lines M, N O and P. This is because, as shown in 3, while filtering a sample 3101 on line L only requires reading samples that will not be affected by deblocking, a sample 3102 on line M cannot be processed by SAO since deblocked samples from line N are not available.

Step 3 (upper stage) is the same as for the "Current VVC Solution", i.e., it avoids accessing samples below the virtual boundary (8101 in FIG. 8) by making the filter smaller. This is can be seen for samples 8103, 8104 and 8105 in FIG. 8. This means that all lines up to and including line L can be filtered using ALF in the upper stage.

Step 4 (lower stage, same as "Current VVC Solution") will now do decoding of the lower CTU.

Step 5 (lower stage, same as "Current VVC Solution") will do deblocking of lines N-P in the upper CTU. To do that it will need to access lines M, N, O and P of pre-SAO data.

That requires four line buffers.

Step 6 (lower stage, new) will do SAO of the missing lines from step two, i.e., lines M, N, O and P. While N, O and P are SAO-filtered as usual, line M is SAO-filtered in a special way as described below.

Step 7 (lower stage, same as Embodiment 0) will differ from previous solutions. As is shown in FIG. 8, this step will ALF-filter lines M, N and O using samples from above the virtual boundary 8101. As an example, when filtering sample 8106, the filter will access lines L, M and N, and when filtering sample 8108, the filter will access lines L M N O P Q and R. To do this it needs post-SAO samples from line L through R. Lines M through R are provided in step 6, but post-SAO samples from line L must have been previously stored in step 2. This means that one extra line buffer will be needed.

The special SAO-filtering of line M can be done in several ways, according to the following sub-embodiments:

Sub-Embodiment 8a

In this embodiment, line M is not SAO-filtered at all. Hence no extra line buffer is needed to store pre-SAO data as was necessary for step 6 in Embodiment 0.

In summary, the following line buffers will be needed for embodiment 8a:

| |
|---|
| Line M with pre-SAO data (used by step 5), stored as 10 bits |
| Line N with pre-SAO data (used by step 5), stored as 10 bits |
| Line O with pre-SAO data (used by step 5), stored as 10 bits |
| Line P with pre-SAO data (used by step 5), stored as 10 bits |
| Line L with post-SAO data (used by step 7), stored as 10 bits |

Hence, in embodiment 8a, only five line buffers need to be stored.

Sub-Embodiment 8b

Figure 11:
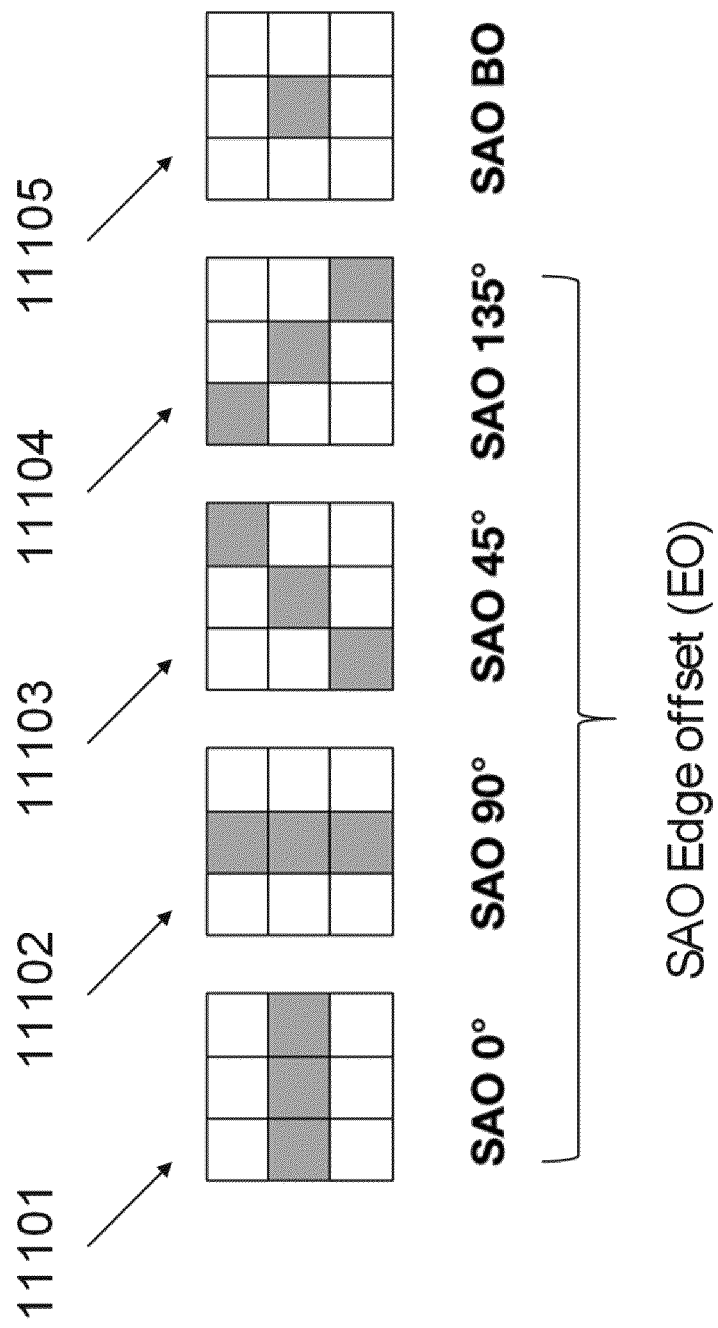
FIG. 11 shows an edge offset consisting of four directions, all requiring surrounding samples.

SAO consists of two types of processing; band offset (BO) SAO, that does not need surrounding samples for filtering, and edge offset (EO) SAO, that does need surrounding samples. As is shown in FIG. 11, edge offset consists of four directions; 0° 1111, 90° 1112, 45° 1113 and 135° 1114, all requiring surrounding samples. Band offset (BO) on the other hand, only needs the sample itself 1115. Turning off band offset for a single line, like is done in sub-embodiment 8a, can result in visible artifacts. Turning off edge offset for a single line is less likely to result in visual artifacts. Therefore, in sub-embodiment 8b, SAO for line M is turned off only for samples using edge offset SAO, while band offset SAO is still carried out as normal on line M. Since band offset SAO does not need surrounding samples, it is possible to filter line M without reading line L. Hence no extra line buffer is needed to store pre-SAO data as was necessary for step 6 in Embodiment 0.

In summary, the following line buffers will be needed for embodiment 8b:

| |
|---|
| Line M with pre-SAO data (used by step 5), stored as 10 bits |
| Line N with pre-SAO data (used by step 5), stored as 10 bits |
| Line O with pre-SAO data (used by step 5), stored as 10 bits |
| Line P with pre-SAO data (used by step 5), stored as 10 bits |
| Line L with post-SAO data (used by step 7), stored as 10 bits |

Sub-Embodiment 8c

As can be seen in FIG. 11, three of the edge offset modes require access to the line above 1112, 1113 and 1114. However, 1111 only needs access to the same line. Therefore, in sub-embodiment 8c, SAO filtering for line M is performed only if the sample is either a) band offset filtered 1115, or b) edge offset with the 0° case 1111. If the sample belongs to any of the modes 1112, 1113 or 1114 of SAO, filtering is avoided for line M. Since the line above is not needed for 1111 or 1115, it is possible to filter line M without reading line L.

Hence, in sub-embodiment 8c, only five line buffers need to be stored.

In summary, the following line buffers that will be needed is shown in the table below.

| |
|---|
| Line M with pre-SAO data (used by step 5); |
| Line N with pre-SAO data (used by step 5); |
| Line O with pre-SAO data (used by step 5); |
| Line P with pre-SAO data (used by step 5); |
| Line L with pre-SAO data (used by step 6); |
| Line L with post-SAO data (new, used by step 7). |

Sub-Embodiment 8d

In this sub embodiment, when SAO filtering line M, the samples immediately above are not fetched from line L, but are instead padded with the samples from line M. This means that all modes of SAO (1111, 1112, 1113, 1114, 1115 in FIG. 11) can be used when filtering line M. Since the line is padded, it is possible to filter line M without reading line L.

Hence, in sub-embodiment 8d, only five line buffers need to be stored.

In summary, the following line buffers that will be needed is shown in the table below.

| |
|---|
| Line M with pre-SAO data (used by step 5); |
| Line N with pre-SAO data (used by step 5); |
| Line O with pre-SAO data (used by step 5); |
| Line P with pre-SAO data (used by step 5); |
| Line L with pre-SAO data (used by step 6); |
| Line L with post-SAO data (new, used by step 7). |

Results

As the above embodiments illustrate, the embodiments reduce ALF-virtual-boundary artifacts by allowing ALF to cross the virtual boundary from below. By keeping filtering above the virtual boundary the same as for the VVC Draft Specification, it is possible to keep the extra line buffer requirements small while still reducing the artifacts substantially.

In this section Bjontegaard delta rate results for embodiment 4 when compared against the current VVC version are presented. A figure of −1% means that it is possible to reach the same measured distortion with 1% less bits. However, since this invention only affects very few samples, the BD-rate impact is small, even though the visual impact is great. Still, it is important to make sure that the BD-rate is not a big positive number, since that would indicate that the method did not work well.

All Intra Over VTM-8.0

|          | Y      | U      | V      |
|----------|--------|--------|--------|
| Class A1 | −0.01% | −0.13% | −0.17% |
| Class A2 | 0.00%  | −0.06% | −0.04% |
| Class B  | −0.01% | −0.06% | −0.06% |
| Class C  | −0.01% | −0.05% | −0.06% |
| Class E  | −0.02% | −0.05% | −0.06% |
| Overall  | −0.01% | −0.07% | −0.08% |
| Class D  | −0.01% | −0.03% | −0.02% |
| Class F  | −0.01% | −0.03% | −0.07% |

Random Access over VTM-8.0

|          | Y      | U      | V      |
|----------|--------|--------|--------|
| Class A1 | −0.03% | −0.22% | −0.13% |
| Class A2 | −0.05% | −0.05% | 0.02%  |
| Class B  | −0.02% | −0.05% | −0.12% |
| Class C  | −0.04% | −0.07% | −0.03% |
| Class E  |        |        |        |
| Overall  | −0.03% | −0.09% | −0.07% |
| Class D  | 0.01%  | −0.04% | −0.17% |
| Class F  | 0.03%  | −0.10% | −0.13% |

Low-delay B over VTM-8.0

|          | Y      | U      | V      |
|----------|--------|--------|--------|
| Class B  | −0.05% | 0.00%  | 0.02%  |
| Class C  | −0.14% | −0.19% | −0.30% |
| Class E  | −0.08% | 0.32%  | 0.12%  |
| Overall  | −0.09% | 0.01%  | −0.06% |
| Class D  | −0.04% | −0.59% | −0.43% |
| Class F  | −0.05% | 0.43%  | −0.19% |

Change Request

The following is text of a contribution that proposes a modification to the VVC Draft Specification.

A low complexity fix for ALF virtual boundary was adopted from JVET-Q0150. An alternative approach proposed in the same contribution was rejected since the increase of two luma line buffers and two chroma line buffers for each component was undesirable. This contribution proposes a combination of the two approaches in JVET-Q0150 as follows: Filtering of a row just above the virtual boundary is performed as currently using the low complexity technique, i.e., not using samples below the virtual boundary. When filtering a row just below the virtual boundary on the other hand, this contribution proposes to change the filtering process so as to let it use also one row just above the virtual boundary. This combined approach is asserted to further reduce visual artifacts from virtual boundary processing. It is claimed that the cost for the approach is 0.6 line buffers for luma samples and two 0.6 line buffers for chroma samples.

ALF virtual boundary processing in VVC defines a virtual horizontal CTU boundary 4 samples above the top row of the below CTU for luma and 2 samples above the top row of the below CTU for chroma. ALF symmetry padding is used to avoid using samples below the virtual boundary when filtering above it, and to avoid using samples above the virtual boundary when filtering below it. To avoid extreme padding when filtering the rows just above and just below the virtual boundary, the filter output is currently attenuated for those rows as described in alternative 2 in JVET-Q0150 (K. Andersson, J. Strom, Z. Zhang, J. Enhorn, "Fix for ALF virtual boundary processing", JVET-Q0150, Brussels, BE, 7-17 Jan. 2020).

There was also a discussion about alternative 1 in the same contribution, where it was proposed to also use samples from the row just above the virtual boundary when filtering the row just below the virtual boundary, and to also use samples from the row just below the virtual boundary when filtering the row just above the virtual boundary. Alternative 1 was asserted to fix the problem completely but at the cost of 2 lines buffers for luma and 2 line buffers for each chroma component, and was therefore rejected by the meeting in favor of alternative 2.

Proposal

The filtering for the row just above the virtual boundary is performed as in the VVC Draft Specification. The filtering for the row just below the virtual boundary however is changed; it now also uses the row just above the virtual boundary (see e.g., FIG. 8, filtering of sample value 8106).

Figure 10:
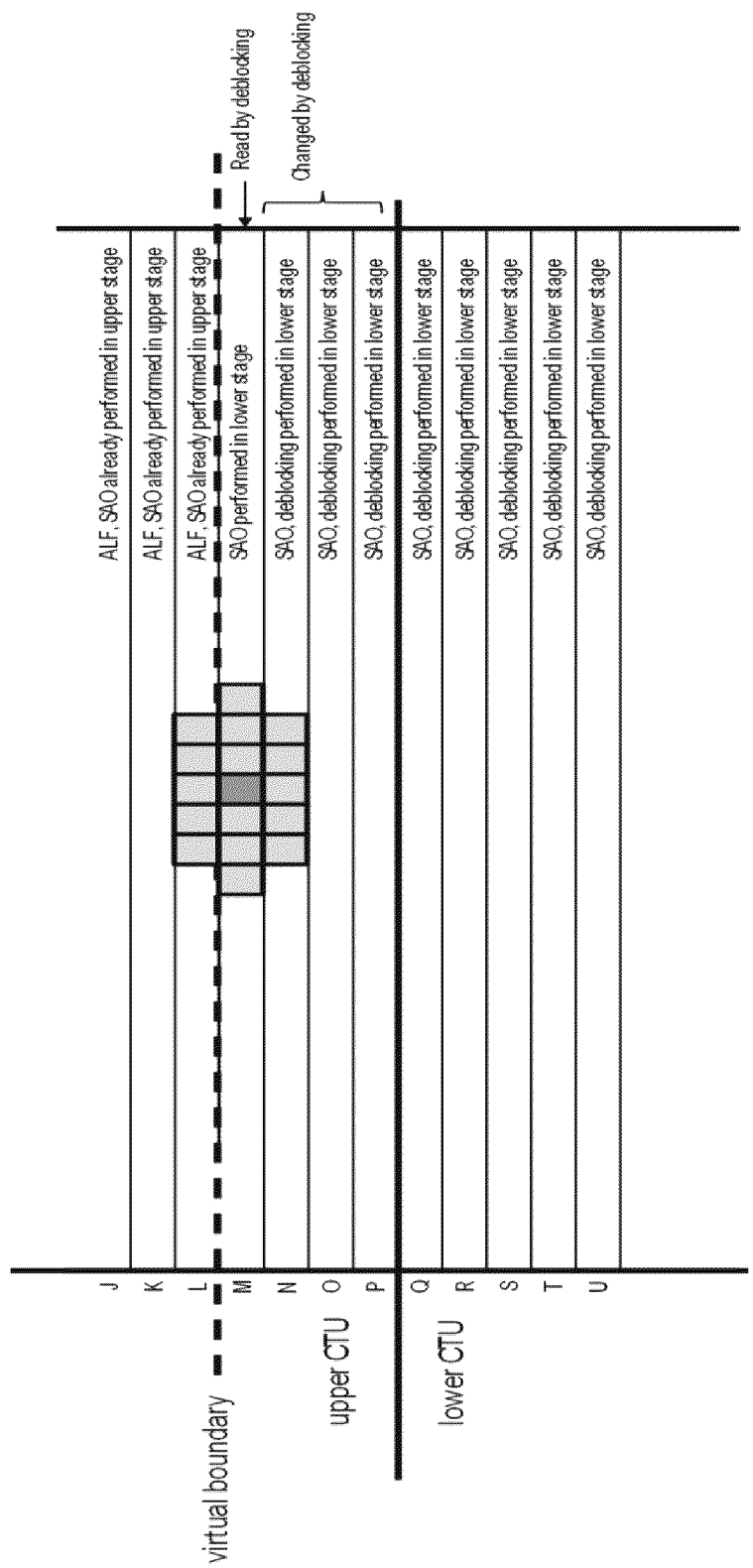
FIG. 10 illustrates an embodiment.

In detail, one can describe the processing as happening in two stages, an upper stage and a lower stage. In the upper stage, all processing that can be done while only having read the upper CTU is done. In the lower stage, the processing that needs information also from the lower CTU is done. Currently in VVC, this can be done as follows:

Upper Stage:
1. Decoding of upper CTU (lines J-P in FIG. 10)
2. SAO of upper CTU, except lines M-P (to SAO-filter line M is not possible since it will need line N which may change due to deblocking)
3. ALF of upper CTU, except lines M-P (ALF does not need to read lines below the virtual boundary when filtering above the virtual boundary, so filtering up to and including L is possible)

Lower Stage
4. Decoding of lower CTU (lines Q-U in FIG. 10)
5. Deblocking of lines N-P of upper CTU (needs line buffers M, N, O, P of pre-deblock data)
6. SAO of upper CTU, lines M-P (needs line buffer L of pre-SAO data)
7. ALF of upper CTU, lines M-P The proposed method carries out step 1 through 6 the same way as currently. The only difference is in step 7, (depicted in FIG. 10), where ALF processing of lines M-P of the upper CTU takes place. In this step the proposed method also accesses line L directly above the virtual boundary. Thus the last step 7 also needs access to a line buffer of L where post-SAO data is stored. Hence, for luma, the line buffers needed for decoding are increased from:

M decoded samples before SAO
N decoded samples before SAO
O decoded samples before SAO
P decoded samples before SAO
L decoded samples before SAO
to:
M decoded samples before SAO
N decoded samples before SAO
O decoded samples before SAO
P decoded samples before SAO
L decoded samples before SAO
L decoded samples after SAO (new)

As an implementation detail, since a line buffer containing L before SAO is necessary both in the current draft of VVC and in the proposed solution, only the SAO offset in every sample needs to be stored in the novel line buffer in order to be able to recreate line L after SAO. Since the SAO offset is a value between −31 and 31 inclusive, at most 6 bits are needed to be stored in the line buffer. Compared to storing a 10-bit value, the extra cost is therefore 6/10=0.6 line buffers for the proposed scheme.

Although this increase of 0.6 line buffers is a drawback compared to the current draft of VVC, it is significantly less than the 2 line buffers needed in alternative 1 in JVET-Q0150. Furthermore, it is also still significantly less than the amount of line buffers that would be required without ALF virtual boundary processing.

It is proposed that Tables 45 and 46 in the VVC Draft Specification are replaced with the New Tables 45 and 46 shown below.

NEW TABLE 45

Specification of y1, y2, y3 and alfShiftY according to the vertical luma sample position y and applyAlfLineBufBoundary

| Condition | alfShiftY | y1 | y2 | y3 |
|---|---|---|---|---|
| ( y = = (CtbSizeY − 5 ) && ( applyAlfLineBufBoundary = = 1 ) | 10 | 0 | 0 | 0 |
| ( y = = (CtbSizeY − 6 \| \| y = = CtbSizeY − 4 ) && ( applyAlfLineBufBoundary = = 1 ) | 7 | 1 | 1 | 1 |
| ( y = = (CtbSizeY − 7 \| \| y = = CtbSizeY − 3 ) && ( applyAlfLineBufBoundary = = 1 ) | 7 | 1 | 2 | 2 |
| Otherwise | 7 | 1 | 2 | 3 |

NEW TABLE 46

Specification of y1, y2 and alfShiftC according to the vertical chroma sample position y and applyAlfLineBufBoundary

| Condition | alfShiftC | y1 | y2 |
|---|---|---|---|
| ( y = = (ctbHeightC − 3 ) && ( applyAlfLineBufBoundary = = 1 ) | 10 | 0 | 0 |
| ( y = = (ctbHeightC − 2 \| \| y = = ctbHeightC − 4 ) && ( applyAlfLineBufBoundary = = 1 ) | 7 | 1 | 1 |
| Otherwise | 7 | 1 | 2 |

It is also proposed to remove the padding of row y equal to CtbSizeY−5 when calculating the activity metric in equations 1472 to 1474 centered on row y equal to CtbSizeY−4, since usage of row y equal to CtbSizeY−5 is allowed when filtering at row y equal to CtbSizeY−4 e.g. just below the virtual boundary, one can also make use of this row for the ALF classification. The change to the specification is in the VVC draft:

8.8.5.5 ALF boundary position derivation process:
The variable clipTopPos is modified as follows:
If y−(CtbSizeY−4) is greater than or equal to 0, the variable clipTopPos is set equal to yCtb+CtbSizeY−4.
Changed to:
The variable clipTopPos is modified as follows:
If y−(CtbSizeY−5) is greater than or equal to 0, the variable clipTopPos is set equal to yCtb+CtbSizeY−5.

In the software this is enabled by simply removing the lines between the brackets [[ and]]:

```
if (pos > 0 && posInCTU == vbPos - 2)
{
  imgY3 = imgY2;
}
[[
else if (pos > 0 && posInCTU == vbPos)
{
  imgY0 = imgY1;
}
]]
```

Summary of Various Embodiments Described Above

Figure 19:
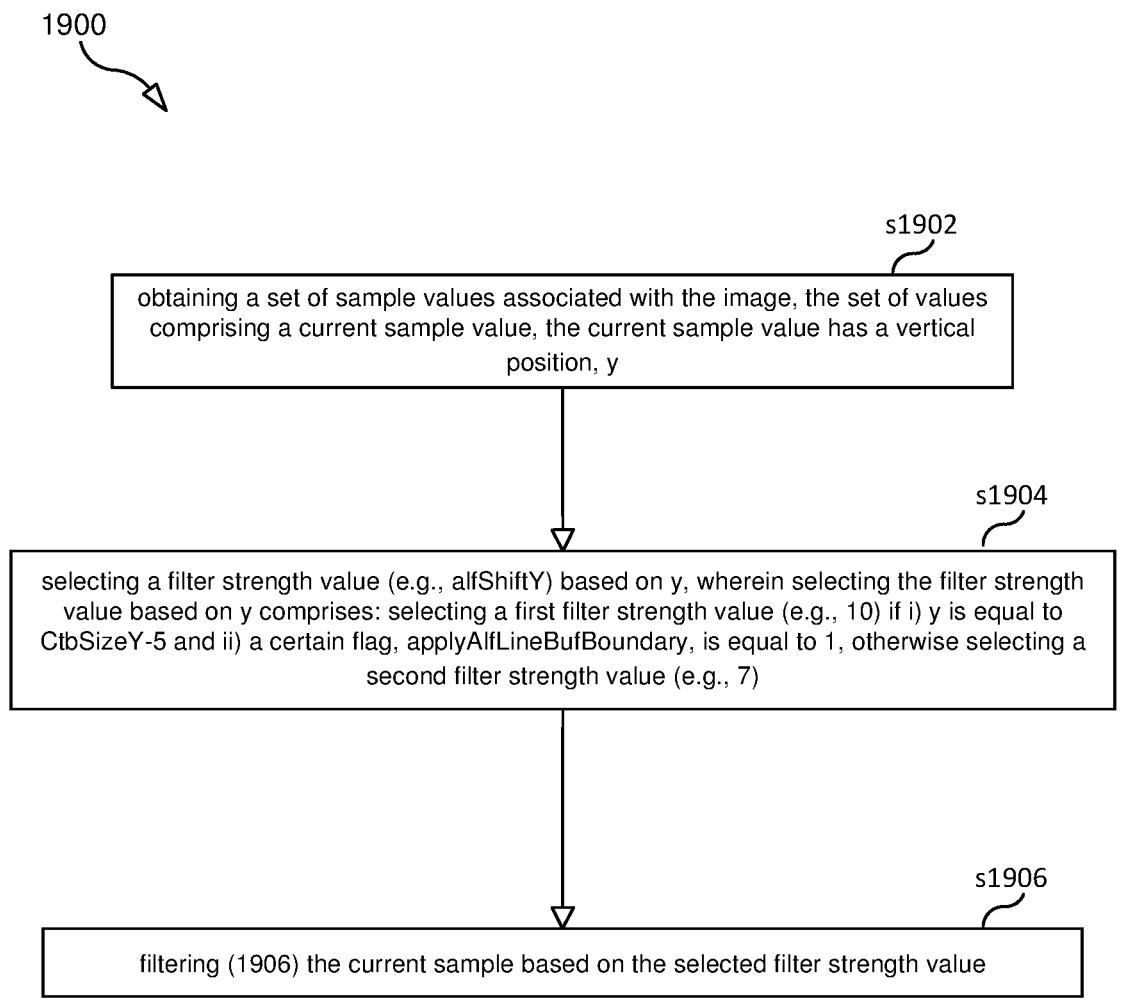
FIG. 19 is a flowchart illustrating a process according to an embodiment.

A1a. A method (1900, See FIG. 19) for processing (e.g., encoding or decoding) an image, the method comprising: obtaining (s1902) a set of sample values associated with the image, the set of sample values comprising a current sample value and sample values neighboring the current sample value, wherein the obtained set of sample values is included within a first rectangular block of sample values, and the current sample value has a vertical position, y; selecting (s1904) a filter strength value (e.g., alfShiftY) based on y, wherein selecting the filter strength value based on y comprises: selecting a first filter strength value (e.g., 10) if i) y is equal to CtbSizeY−5 and ii) a certain flag, applyAlfLineBufBoundary, is equal to 1, otherwise selecting a second filter strength value (e.g., 7), where CtbSizeY is a vertical size of the first rectangular block; and filtering (s1906) the current sample based on the selected filter strength value.

Figure 21:
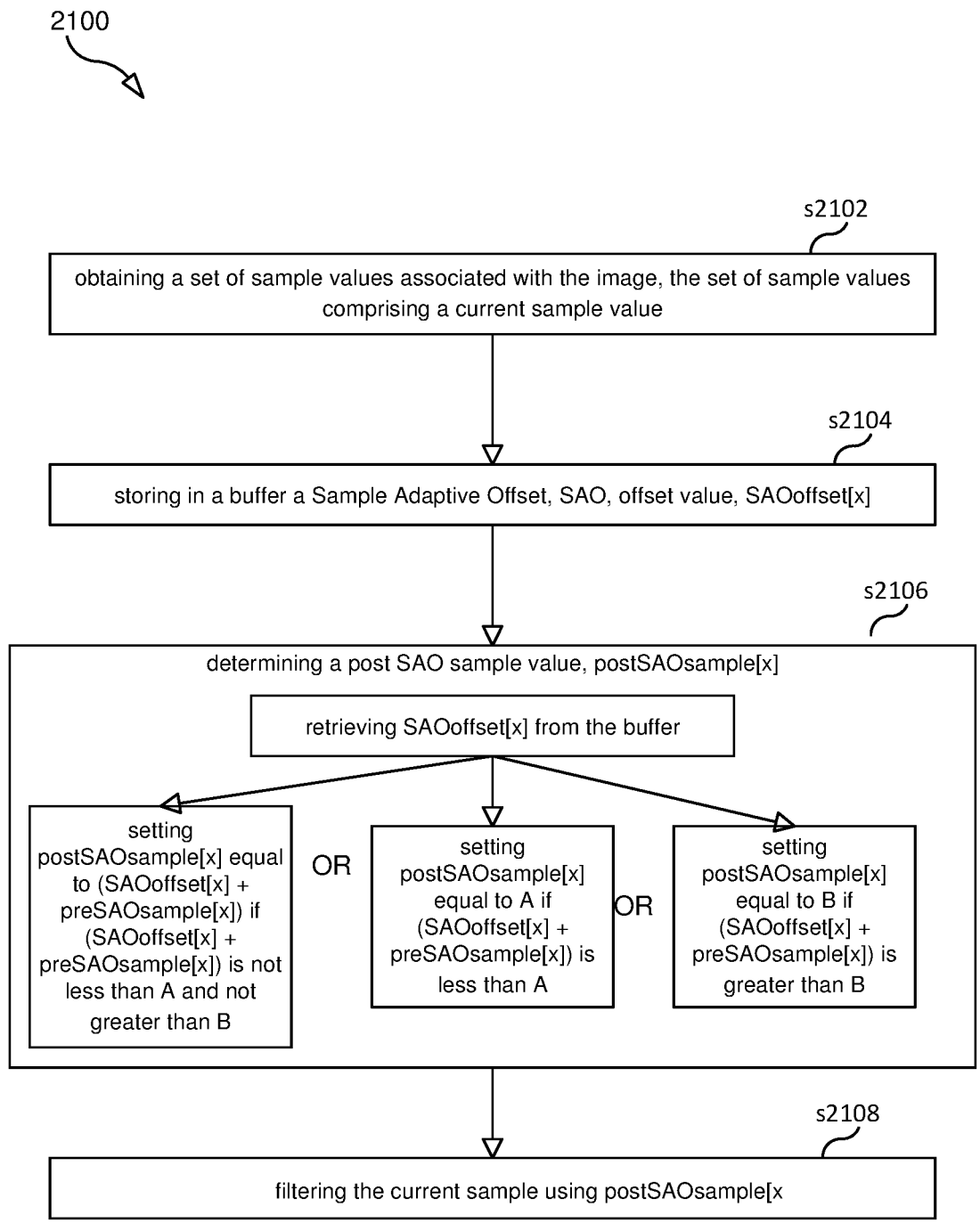
FIG. 21 is a flowchart illustrating a process according to an embodiment.

A1b. A method for processing (e.g., encoding or decoding) an image, the method comprising: obtaining a set of sample values associated with the image, the set of sample values comprising a current sample value and sample values neighboring the current sample value, wherein the obtained set of sample values is included within a first rectangular block of sample values, and the current sample value has a vertical position, y; including (1904) neighboring samples from row y equal to CtbSizeY−5 and row y equal to CtbSizeY−3 but not any neighboring sample above row y equal to CtbSizeY−5 or below row y equal to CtbSizeY−3 when filtering a current sample value at row y equal to CtbSizeY−4; and filtering (1906) the current sample based on the included neighboring sample B1. A method (2100, See FIG. 21) for processing (e.g., encoding or decoding) an image, the method comprising: obtaining (s2102) a set of sample values associated with the image, the set of sample values comprising a current sample value and sample values neighboring the current sample value, wherein the obtained set of sample values is included within a first rectangular block of sample values; storing (s2104) in a buffer a Sample Adaptive Offset, SAO, offset value, SAOoffset[x]; determining (s2106) a post SAO sample value, postSAOsample[x]; filtering (s2108) the current sample using postSAOsample[x], wherein determining postSAOsample[x] comprises: retrieving SAOoffset[x] from the buffer; and i) setting postSAOsample[x] equal to (SAOoffset[x]+preSAOsample[x]) if (SAOoffset[x]+preSAOsample[x]) is not less than A and not greater than B, wherein A and B are predetermined values, ii) setting postSAOsample[x]equal to A if (SAOoffset[x]+preSAOsample[x]) is less than A, or iii) setting postSAOsample[x] equal to B if (SAOoffset[x]+preSAOsample[x]) is greater than B.

B2. The method of embodiment B1, wherein storing SAOoffset[x] in the buffer comprises storing SAOoffset[x] using not more than six bits.

Figure 22:
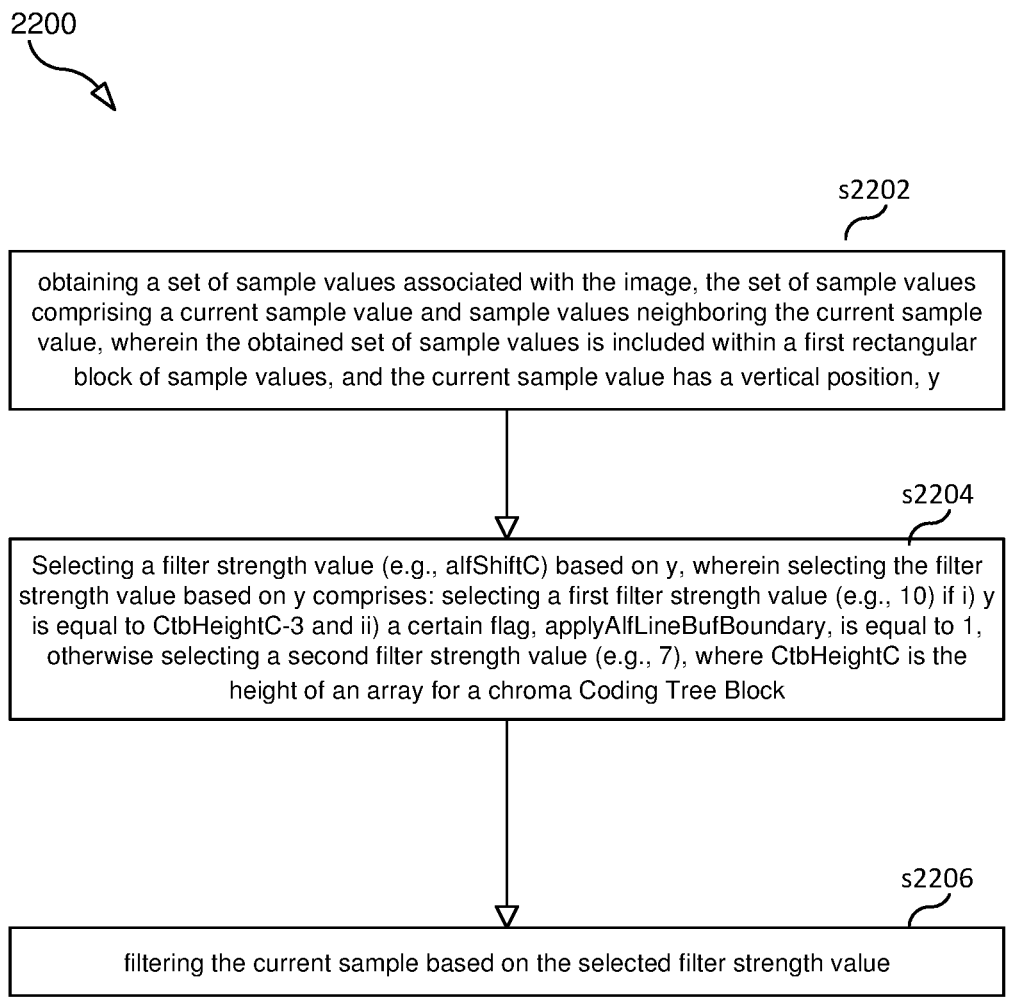
FIG. 22 is a flowchart illustrating a process according to an embodiment.

C1. A method (2200, See FIG. 22) for processing (e.g., encoding or decoding) an image, the method comprising: obtaining (s2202) a set of sample values associated with the image, the set of sample values comprising a current sample value and sample values neighboring the current sample value, wherein the obtained set of sample values is included within a first rectangular block of sample values, and the current sample value has a vertical position, y; selecting (s2204) a filter strength value (e.g., alfShiftC) based on y, wherein selecting the filter strength value based on y comprises: selecting a first filter strength value (e.g., 10) if i) y is equal to CtbHeightC−3 and ii) a certain flag, applyAlfLineBufBoundary, is equal to 1, otherwise selecting a second filter strength value (e.g., 7), where CtbHeightC is the height of an array for a chroma Coding Tree Block; and filtering (s2206) the current sample based on the selected filter strength value.

Figure 23:
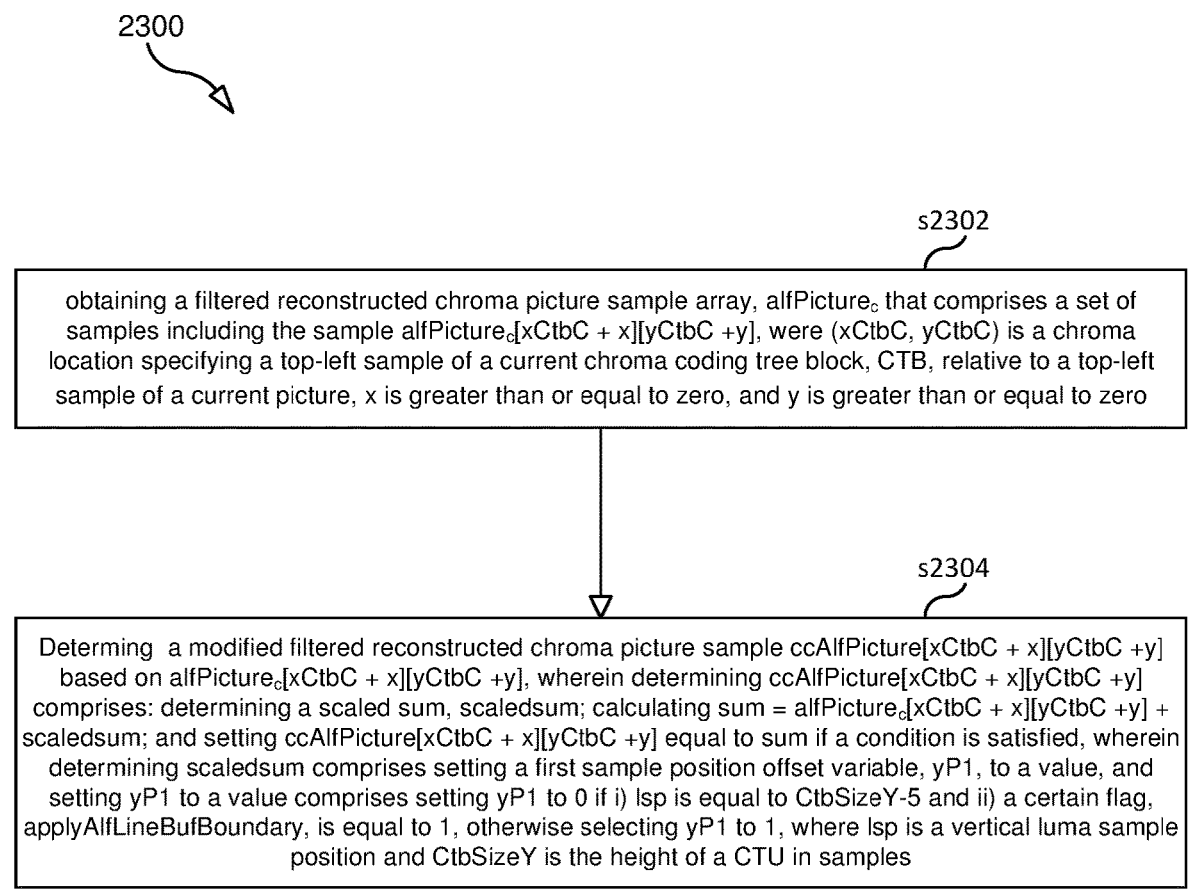
FIG. 23 is a flowchart illustrating a process according to an embodiment.

D1. A method (2300, See FIG. 23) for cross-component filtering, comprising: obtaining (s2302) a filtered reconstructed chroma picture sample array, alfPicture$_c$ that comprises a set of samples including the sample alfPicture$_c$[xCtbC+x][yCtbC+y], were (xCtbC, yCtbC) is a chroma location specifying a top-left sample of a current chroma coding tree block, CTB, relative to a top-left sample of a current picture, x is greater than or equal to zero, and y is greater than or equal to zero; and determining (s2304) a modified filtered reconstructed chroma picture sample ccAlfPicture[xCtbC+x][yCtbC+y] based on alfPicture$_c$[xCtbC+x][yCtbC+y], wherein determining ccAlfPicture[xCtbC+x][yCtbC+y] comprises: determining a scaled sum, scaledsum; calculating sum=alfPicture$_c$[xCtbC+x][yCtbC+y]+scaledsum; and setting ccAlfPicture[xCtbC+x][yCtbC+y] equal to sum if a condition is satisfied, wherein determining scaledsum comprises setting a first sample position offset variable, yP1, to a value, and setting yP1 to a value comprises setting yP1 to 0 if i) lsp is equal to CtbSizeY−5 and ii) a certain flag, applyAlfLineBufBoundary, is equal to 1, otherwise selecting yP1 to 1, where lsp is a vertical luma sample position and CtbSizeY is the height of a CTU in samples.

Figure 24:
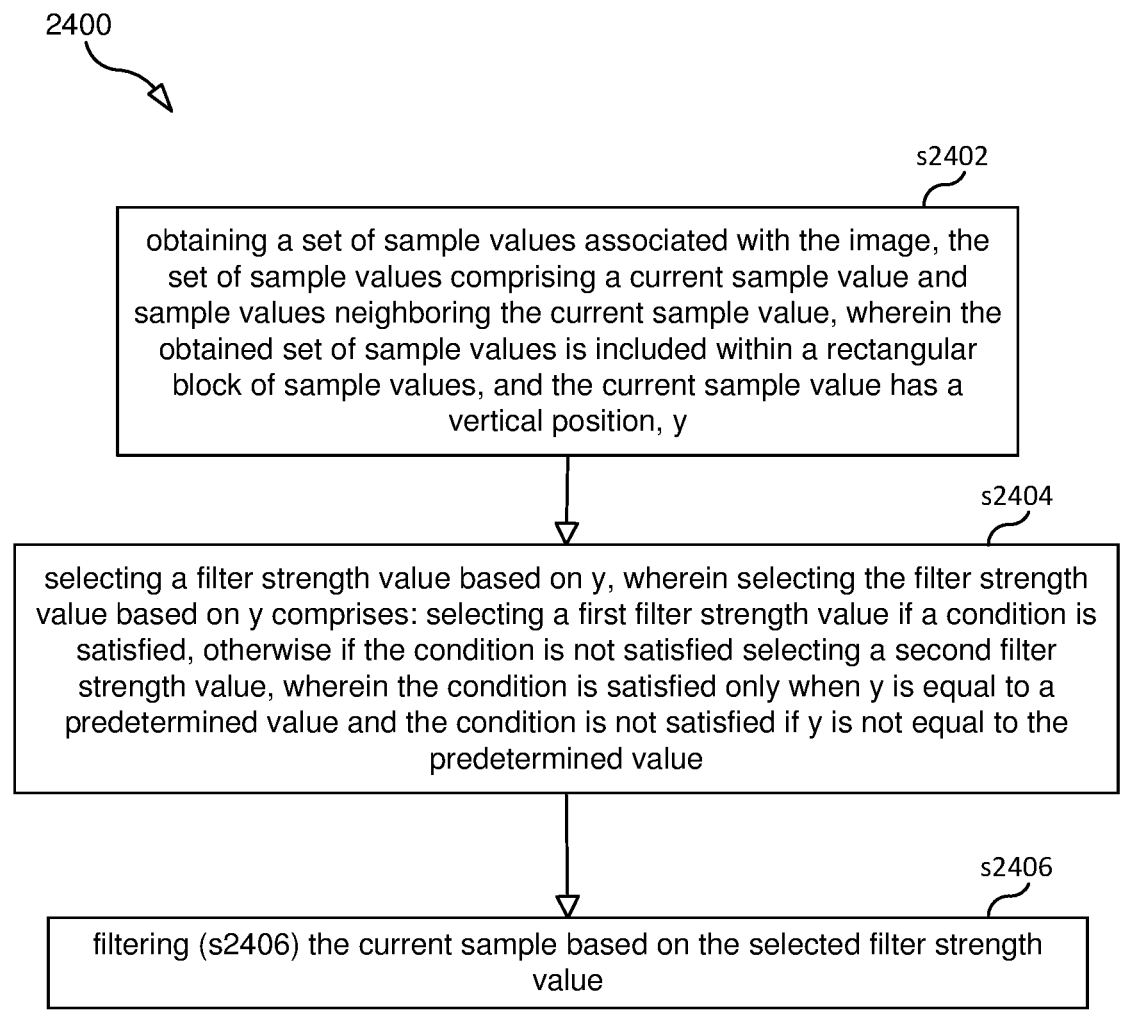
FIG. 24 is a flowchart illustrating a process according to an embodiment.

E1. A method (2400, See FIG. 24) for processing (e.g., encoding or decoding) an image, the method comprising: obtaining a set of sample values associated with the image, the set of sample values comprising a current sample value and sample values neighboring the current sample value, wherein the obtained set of sample values is included within a rectangular block of sample values, and the current sample value has a vertical position, y (step s2402); selecting a filter strength value based on y, wherein selecting the filter strength value based on y comprises: selecting a first filter strength value if a condition is satisfied, otherwise if the condition is not satisfied selecting a second filter strength value, wherein the condition is satisfied only when y is equal to a predetermined value and the condition is not satisfied if y is not equal to the predetermined value (step s2404); and filtering the current sample based on the selected filter strength value (step s2406).

E2. The method of embodiment E1 wherein the first filter strength value is 10.

E3. The method of embodiment E1 or E2 wherein the second filter strength value is 7.

E4. The method of any one of embodiments E1-E3, wherein the conditions is satisfied when y is equal to the predetermined value and a certain flag (e.g., applyAlfLineBufBoundary) is equal to 1.

E5. The method of any one of embodiments E1-E4, wherein the predetermined value is CtbSizeY−5, wherein CtbSizeY is a vertical size of the rectangular block.

E6. The method of any one of embodiments E1-E4, wherein the predetermined value is CtbHeightC−3, wherein CtbHeightC is the height of an array for a chroma Coding Tree Block.

Figure 20:
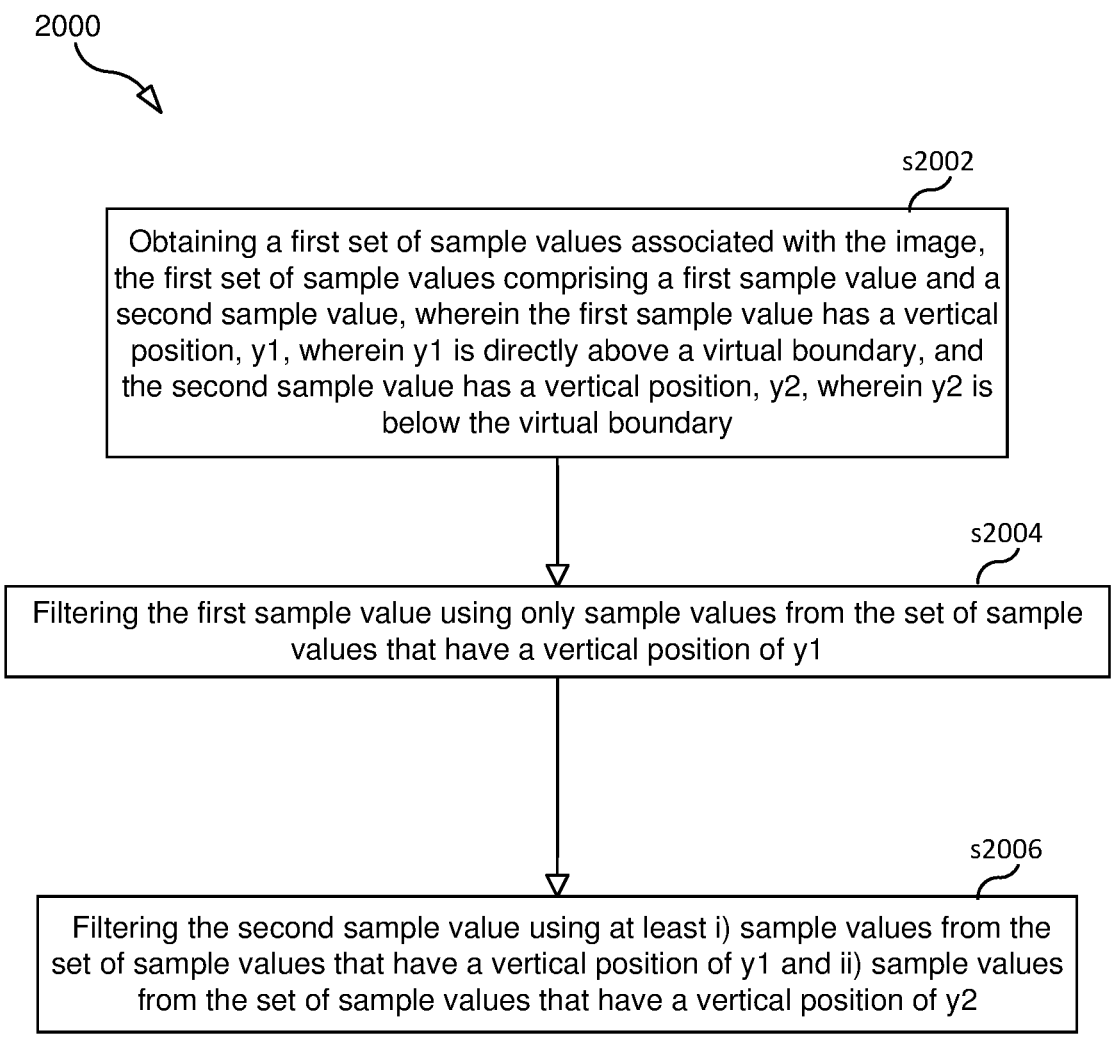
FIG. 20 is a flowchart illustrating a process according to an embodiment.

E7. A method (2000, See FIG. 20) for processing (e.g., encoding or decoding) an image, the method comprising: obtaining (step s2002) a first set of sample values associated with the image, the first set of sample values comprising a first sample value and a second sample value, wherein the first sample value has a vertical position, y1, wherein y1 is directly above a virtual boundary, and the second sample value has a vertical position, y2, wherein y2 is below the virtual boundary; filtering (step s2004) the first sample value using only sample values from the set of sample values that have a vertical position of y1; filtering (step s2006) the second sample value using at least i) sample values from the set of sample values that have a vertical position of y1 and ii) sample values from the set of sample values that have a vertical position of y2.

E8. The method of embodiment E7, wherein |y2−y1| is equal to 1, 2, or 3.

E9. The method of embodiment E7 or E8, wherein filtering the second sample value comprises filtering the second sample value using not only i) sample values from the set of sample values that have a vertical position of y1 and ii) sample values from the set of sample values that have a vertical position of y2, but also iii) sample values from the set of sample values that have a vertical position of y3, wherein y3 is greater than y2.

E10. The method of embodiment E7, E8, or E9, wherein filtering the second sample value comprises filtering the second sample value using not only i) sample values from the set of sample values that have a vertical position of y1 and ii) sample values from the set of sample values that have a vertical position of y2, but also iii) sample values from the set of sample values that have a vertical position of y3, wherein y3 is between y2 and y1.

E11. The method of any one of embodiments E7-E10, wherein the virtual boundary is defined with respect to a block boundary between the first set of sample values and a second set of sample values, wherein the virtual boundary is parallel with the block boundary and separated from the block boundary by at least one row or column of sample values included in the first set of sample values.

E12. The method of embodiment E11, wherein the first set of sample values is a Coding Tree Block, CTB, of a first Coding Tree Unit, CTU, and the second set of sample values is a CTB of a second CTU.

While various embodiments are described herein, it should be understood that they have been presented by way of example only, and not limitation. Thus, the breadth and scope of this disclosure should not be limited by any of the above described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration.

Accordingly, it is contemplated that some steps may be added, some steps may be omitted, the order of the steps may be re-arranged, and some steps may be performed in parallel.

ABBREVIATIONS

ALF Adaptive Loop Filtering
SAO Sample Adaptive Offset
VVC Versatile Video Coding
CTC Common Test Conditions
BD-rate Bjontegaard Delta rate

REFERENCES

[1] B. Bross, J. Chen, S. Liu, Y.-K. Wang, "Versatile Video Coding (Draft 8)", JVET-Q2001-v15, January 2020, (available at phenix.it-sudparis.eu/jvet/doc_end_user/documents/17_Brussels/wg11/JVET-Q2001-v15.zip)

The invention claimed is:

1. A method for processing an image, the method comprising:
   obtaining a set of sample values associated with the image, the set of sample values comprising a current sample value and sample values neighboring the current sample value, wherein the obtained set of sample values is included within a rectangular block of sample values, and the current sample value has a vertical position, y;
   selecting a filter strength value based on y, wherein selecting the filter strength value based on y comprises: selecting a first filter strength value if a condition is satisfied, otherwise if the condition is not satisfied selecting a second filter strength value, wherein the condition is satisfied if and only if y is equal to a single predetermined value and zero or more other criterions are satisfied and the condition is not satisfied for every value of y that is not equal to the predetermined value; and
   filtering the current sample based on the selected filter strength value.

2. The method of claim 1, wherein the first filter strength value is 10.

3. The method of claim 1, wherein the second filter strength value is 7.

4. The method of claim 1, wherein the conditions is satisfied when y is equal to the predetermined value and a certain flag is equal to 1.

5. The method of claim 1, wherein the predetermined value is CtbSizeY-5, wherein CtbSizeY is a vertical size of the rectangular block.

6. The method of claim 1, wherein the predetermined value is CtbHeightC-3, wherein CtbHeightC is the height of an array for a chroma Coding Tree Block.

7. A non-transitory computer readable storage medium storing a computer program comprising instructions which when executed by processing circuitry of an apparatus causes the apparatus to perform a method comprising:
   obtaining a set of sample values associated with the image, the set of sample values comprising a current sample value and sample values neighboring the current sample value, wherein the obtained set of sample values is included within a rectangular block of sample values, and the current sample value has a vertical position, y;
   selecting a filter strength value based on y, wherein selecting the filter strength value based on y comprises: selecting a first filter strength value if a condition is satisfied, otherwise if the condition is not satisfied selecting a second filter strength value, wherein the condition is satisfied if and only if y is equal to a single predetermined value and zero or more other criterions are satisfied and the condition is not satisfied for every value of y that is not equal to the predetermined value; and
   filtering the current sample based on the selected filter strength value.

8. An apparatus for processing an image, wherein the apparatus is configured to perform a method comprising:
   obtaining a set of sample values associated with the image, the set of sample values comprising a current sample value and sample values neighboring the current sample value, wherein the obtained set of sample values is included within a rectangular block of sample values, and the current sample value has a vertical position, y;
   selecting a filter strength value based on y, wherein selecting the filter strength value based on y comprises: selecting a first filter strength value if a condition is satisfied, otherwise if the condition is not satisfied selecting a second filter strength value, wherein the condition is satisfied if and only if y is equal to a single predetermined value and zero or more other criterions are satisfied and the condition is not satisfied for every value of y that is not equal to the predetermined value; and
   filtering the current sample based on the selected filter strength value.

* * * * *